United States Patent
Mitsui

(10) Patent No.: US 6,985,626 B2
(45) Date of Patent: Jan. 10, 2006

(54) PATTERN EVALUATION METHOD, PATTERN EVALUATION SYSTEM AND COMPUTER-READABLE RECORDED MEDIUM

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 822 days.

(21) Appl. No.: 10/105,387

(22) Filed: Mar. 26, 2002

(65) Prior Publication Data

US 2002/0141647 A1 Oct. 3, 2002

(30) Foreign Application Priority Data

Mar. 27, 2001 (JP) .............................. 2001-089731

(51) Int. Cl.
*G06K 9/46* (2006.01)

(52) U.S. Cl. ............ 382/201; 250/559.22; 250/559.36; 382/144; 382/199; 382/203

(58) Field of Classification Search ........... 250/559.22, 250/559.36; 382/144, 199, 203
See application file for complete search history.

(56) References Cited

U.S. PATENT DOCUMENTS

| 5,872,863 | A  | * | 2/1999 | Tsuboi et al. ............... 382/151 |
| 6,529,258 | B2 | * | 3/2003 | Watanabe et al. ........... 349/143 |
| 6,549,648 | B1 | * | 4/2003 | Rinn ......................... 382/151 |

FOREIGN PATENT DOCUMENTS

| JP | 08-194734 | 7/1996 |
| JP | 11-201919 | 7/1999 |

* cited by examiner

*Primary Examiner*—Kanjibhai Patel
*Assistant Examiner*—Gregory Desire
(74) *Attorney, Agent, or Firm*—Finnegan, Henderson, Farabow, Garrett & Dunner, L.L.P.

(57) ABSTRACT

A pattern evaluation method includes processing image data of at least one pattern serving as an object to be evaluated and detecting coordinates of edge points of the pattern in an image of the image data, making pairs of edge points from the edge points of the pattern, setting an arbitrary axis, calculating a distances between the edge points of each pair of the pairs of edge points and an angle between a straight line connecting the edge points of the pair and the axis, preparing a distance/angle distribution map which represents distribution of the distances and angles of the pairs of edge points, extracting a characteristic point of the distance/angle distribution map and analyzing the pattern on the basis of the extracted characteristic point.

46 Claims, 23 Drawing Sheets

IN CASE WHERE DIVIDING LINE IS
TAKEN IN A DIRECTION OF 90 DEGREES

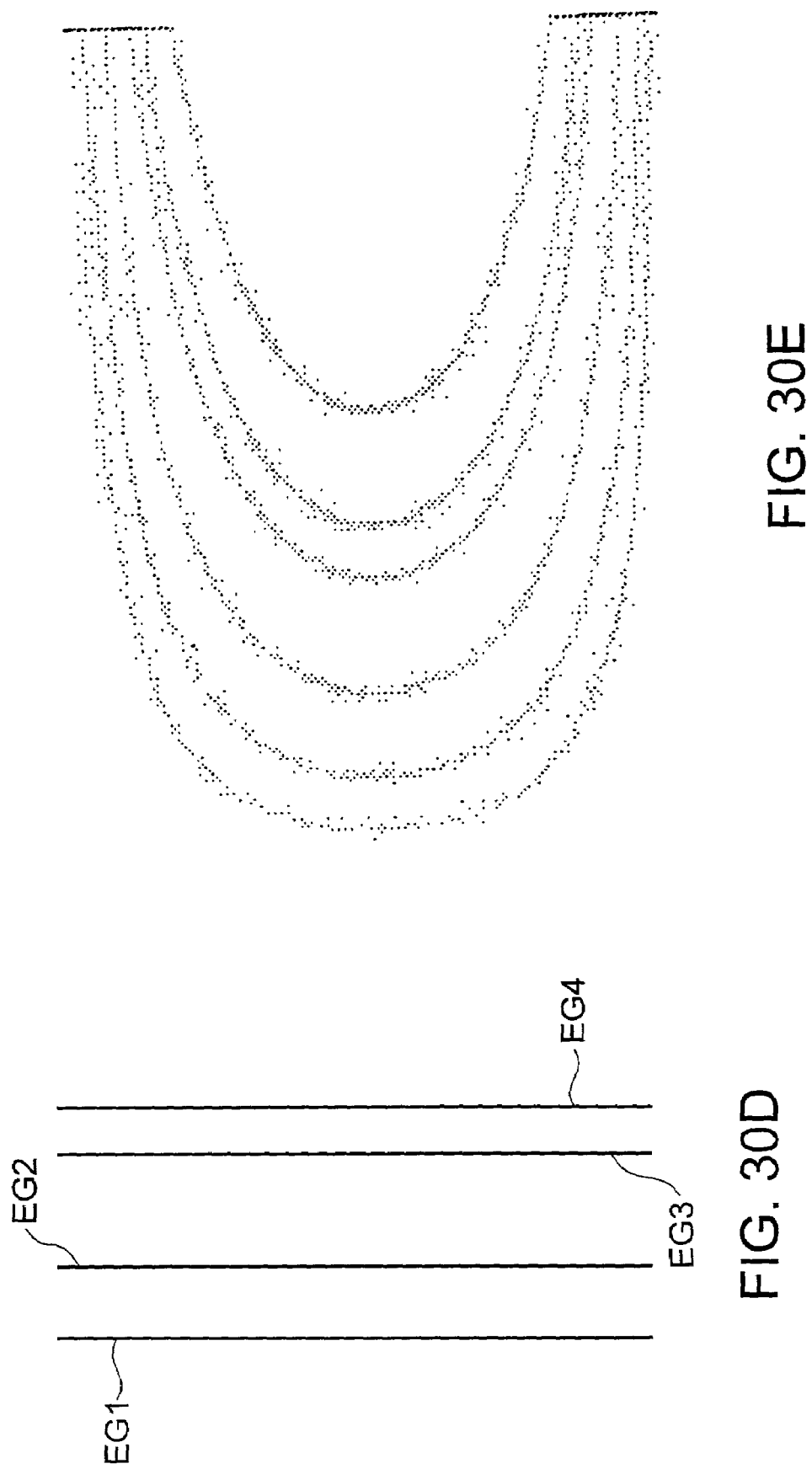

PATTERN EVALUATION METHOD, PATTERN EVALUATION SYSTEM AND COMPUTER-READABLE RECORDED MEDIUM

CROSS REFERENCE TO RELATED APPLICATION

This application claims the benefit of priority from the prior Japanese Patent Application No. 2001-089731, filed on Mar. 27, 2001, the entire contents of which are incorporated herein by reference.

BACKGROUND OF THE INVENTION

1. Field of the Invention

The present invention generally relates to a pattern evaluation method, a pattern evaluation system, and a computer-readable recording medium.

2. Description of the Related Art

As an example of a conventional pattern evaluation method, a method for evaluating a fine pattern of a semiconductor will be described below.

Evaluation of a pattern is important in a semiconductor fabricating process. This is particularly conspicuous with respect to a fine pattern formed in a lithography process and/or an etching process. Conventionally, there is generally adopted a method for measuring and evaluating the dimension of a pattern (e.g., a line width in the case of a line pattern, a hole diameter in the case of a hole pattern) by means of a CDSEM (Critical Dimension Scanning Electron Microscope) using electron beams. In a CDSEM, a secondary electron profile is read from a pattern SEM image acquired from a sample, and an edge of a pattern is detected from the profile by an edge detecting algorithm. Then, the dimension of the pattern is calculated from coordinates of the detected edge by a CD measuring algorithm suitable for the purpose of each measurement. For example, when the line width of a line pattern intends to be obtained, right and left edges of the line are detected by the linear regression or threshold method from line pixels of an SEM image in electron beam scanning directions. With respect to the detected right and left edges, pairs of edges are obtained in a range specified by the measurement, and the average of the distances between the pairs of edges (the differences between X coordinates at edge points) is calculated as the line width of the line pattern. For example, in the case of a pattern which does not have a constant width, the maximum or minimum distance between the pairs of edges is calculated as the maximum width or the minimum line width, and the results thereof are outputted as a measured value.

However, in the above described conventional method, there is a problem in that it is not possible to carry out measurement unless the direction of a pattern to be measured (which will be hereinafter referred to as a CD direction) is coincident with the X-axis direction which is same as the scanning direction of electron beams in the case of an SEM. Therefore, for example, in order to eliminate such a problem, measurement is carried out after the scanning direction of electron beams is caused to be coincident with the CD direction, or measurement is carried out after an image processing, such as the affine transformation, is used for rotating an image to cause the CD direction to be coincident with the X-axis direction which is same as the scanning direction of electron beams in the case of an SEM. However, it takes an excessive time to carry out these processes, so that these processes are not preferably carried out in order to shorten the measuring time. Moreover, if the CD direction is not previously known prior to measurement, it is required to assign the scanning direction of electron beams in the case of an SEM or the image rotating angle to a certain range, so that it takes a longer time.

Similarly, if a hole pattern is an object to be measured, the maximum value of an SEM image in X-axis or Y-axis directions is measured as the hole diameter of the pattern in the conventional method. However, this method is difficult to obtain the maximum diameter, for example, if the maximum diameter of the pattern is inclined with respect to X-axis or Y-axis. In addition, in view of the distortion of the shape of the hole pattern, a method for calculating an approximate diameter from an area surrounded by edge points or a least square circle is carried out. However, it is impossible to grasp the shape of a complicated pattern only using these average measured values.

BRIEF SUMMARY OF THE INVENTION

According to a first aspect of the present invention, there is provided a pattern evaluation method comprising: processing image data of at least one pattern serving as an object to be evaluated and detecting coordinates of edge points of the pattern in an image of the image data; making pairs of edge points from the edge points of the pattern; setting an arbitrary axis; calculating a distances between the edge points of each pair of the pairs of edge points and an angle between a straight line connecting the edge points of the pair and the axis; preparing a distance/angle distribution map which represents distribution of the distances and angles of the pairs of edge points; extracting a characteristic point of the distance/angle distribution map; and analyzing the pattern on the basis of the extracted characteristic point.

According to a second aspect of the present invention, there is provided a pattern evaluation system comprising: an edge point detecting part which receives image data of at least one pattern which is an object to be evaluated and processes the image data to detect coordinates of an edge point of the pattern; a pairing part which makes a pair of edge points of the pattern; an calculation part which sets an arbitrary axis and calculates a distance between edge points constituting the pair of edge points and an angle between a straight line connecting the edge points and the axis; a distance/angle distribution map preparing part which prepares a distance/angle distribution map which represents distribution of the distance and the angle of the pair of edge points; a characteristic point extracting part which extracts a characteristic point of the distance/angle distribution map; and an analyzing part which analyzes the pattern on the basis of the extracted characteristic point.

According to a third aspect of the present invention, there is provided a computer-readable recorded medium for use in a computer, the medium having recorded a program for causing the computer to execute a pattern evaluation method, the method comprising: processing image data of at least one pattern serving as an object to be evaluated and detecting coordinates of edge points of the pattern in an image of the image data; making pairs of edge points from the edge points of the pattern; setting an arbitrary axis; calculating a distances between the edge points of each pair of the pairs of edge points and an angle between a straight line connecting the edge points of the pair and the axis; preparing a distance/angle distribution map which represents distribution of the distances and angles of the pairs of edge points; extracting a characteristic point of the distance/ angle distribution map; and analyzing the pattern on the basis of the extracted characteristic point.

BRIEF DESCRIPTION OF THE DRAWINGS

In the drawings:

FIG. 30D is a diagram schematically showing the edge groups EG1 through EG4 of each sequence of edge points of the line patterns LP14 and LP15 shown in FIG. 30A;

FIG. 30E is a diagram overlapping the respective DAD maps of the edge groups EG1 through EG4 shown in FIG. 30D;

DETAILED DESCRIPTION OF THE INVENTION

Referring now to the accompanying drawings, some embodiments of the present invention will be described below. In the following embodiments, evaluation of a fine pattern of a semiconductor will be described. However, the present invention should not be limited to such evaluation and can be applied to various industrial fields as a new pattern evaluation technique. In addition, SEM images supplied from a CDSEM as image data of a pattern to be evaluated will be described below. However, this is only an example, and the present invention can be applied to general patterns. Therefore, of course, the present invention can be applied to image data acquired from optical instruments, such as digital cameras and scanners. Furthermore, measurement of a pattern in the following descriptions includes the following items or the like.

(1) Maximum Value, Minimum Value and Average value of Line Width in Line Pattern, and Maximum Value, Minimum Value of Ferret Diameter in Hole Pattern and Approximate Diameter of Hole Pattern (2) Inclined Angle of Pattern (defined by Angle of Maximum Ferret Diameter in the case of Hole Pattern)

Figure 1:
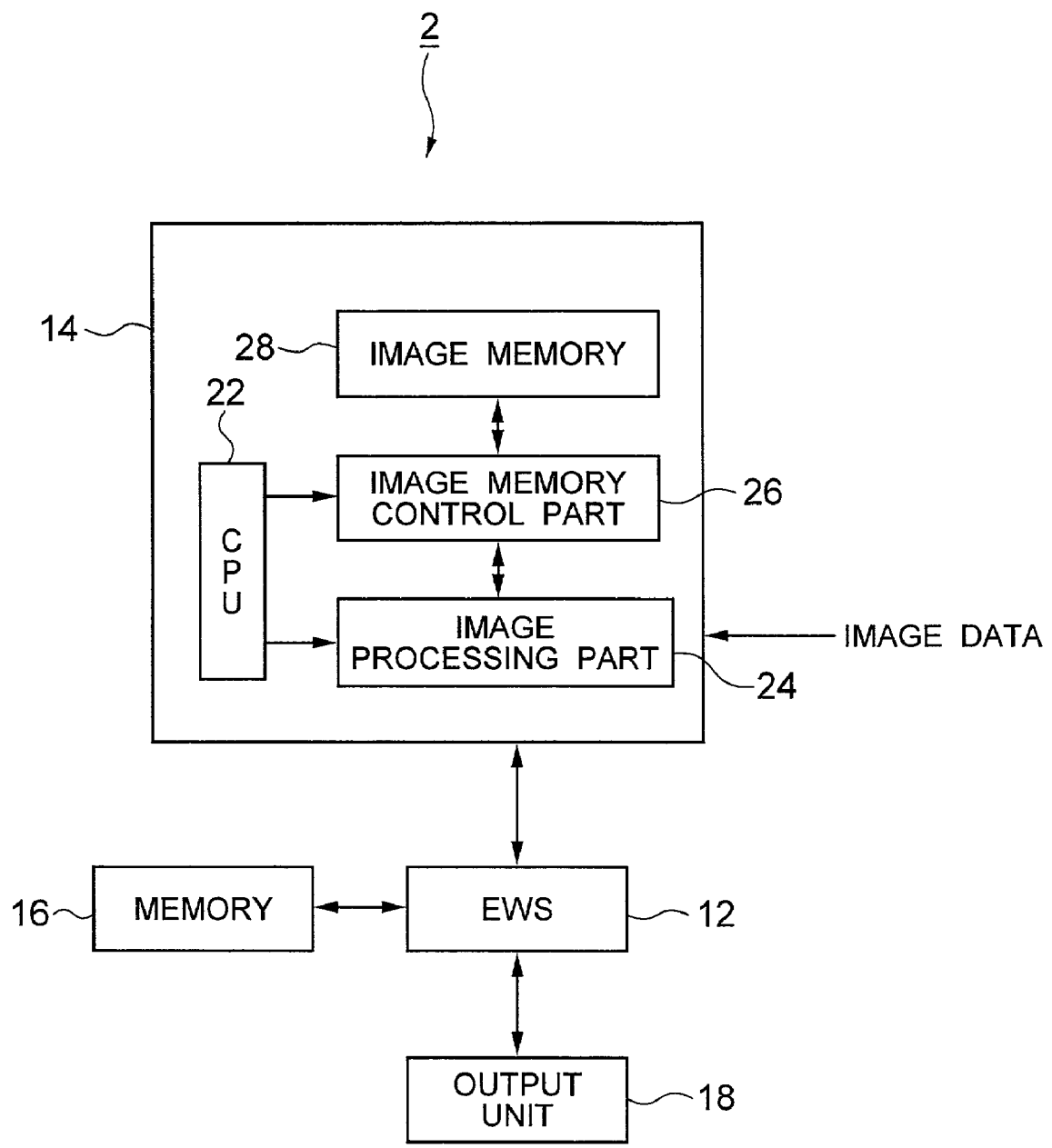
FIG. 1 is a block diagram showing an embodiment of a pattern evaluation system according to the present invention.

(3) Roughness of Pattern (4) The above described Measured Value in Inclined Pattern, and Inclined Angle thereof (5) The above described Measured Value in Pattern projected in Arbitrary Direction (6) Average Value of the above described Measured Values when a plurality of patterns are simultaneously projected (A) Embodiment of Pattern Evaluation System FIG. 1 is a block diagram showing an embodiment of a pattern evaluation system according to the present invention. The pattern evaluation system 2 shown in this figure comprises a work station 12, an image processing unit 14, a memory 16 and an output unit 18.

The memory 16 is designed to store a recipe file in which algorithm in a pattern evaluation method according to the present invention is written. The work station 12 is designed to read the recipe file from the memory 16 to control the whole system in accordance with the recipe file and to extract information on characteristic points and so forth according to the purpose of measurement from a distance/angle distribution map (which will be hereinafter referred to as a DAD map) which will be described later. The output unit 18 is designed to display a DAD map on a display or the like together with the above described characteristic items. The DAD map is supplied from the image processing unit 14 via the work station 12. The characteristic items are extracted by the work station 12. While the DAD map or the like has been displayed by the output unit 18 in this embodiment, it is not particularly required to display the DAD map or the like, and these information may be only stored in the memory 16.

The image processing unit 14 includes a CPU 22, an image processing part 24, an image memory control part 26 and an image memory 28.

The image processing part 24 is designed to receive SEM image data, which is supplied from a CDSEM (not shown in FIG. 1, see FIG. 29), to carry out an image processing which will be described later. The image memory 28 has a plurality of storage regions for storing SEM image data and DAD map data in different storage regions under the control of the image memory control part 26. The image memory control part 26 is designed to execute proportional-distribution of virtual sub-pixels on the basis of a distance between edge points and an angle of a straight line connecting a pair of edge points with respect to X-axis for every pair of edge points which will be described later and adds a memory address to DAD data as image data of a plurality of bits.

Referring to the accompanying drawings, the operation of the pattern evaluation system 2 shown in FIG. 2 will be described as the embodiments of a pattern evaluation method according to the present invention.

(B) Embodiments of Pattern Evaluation Method

Embodiments of a pattern evaluation method according to the present invention will be explained hereinafter. The first through fourth and the ninth embodiments are explained with examples of line patterns as objects to be evaluated and the fifth through eighth, eleventh, twelfth and thirteenth embodiments are explained with examples of hole patterns as objects to be evaluated.

(1) First Embodiment

Figure 2:
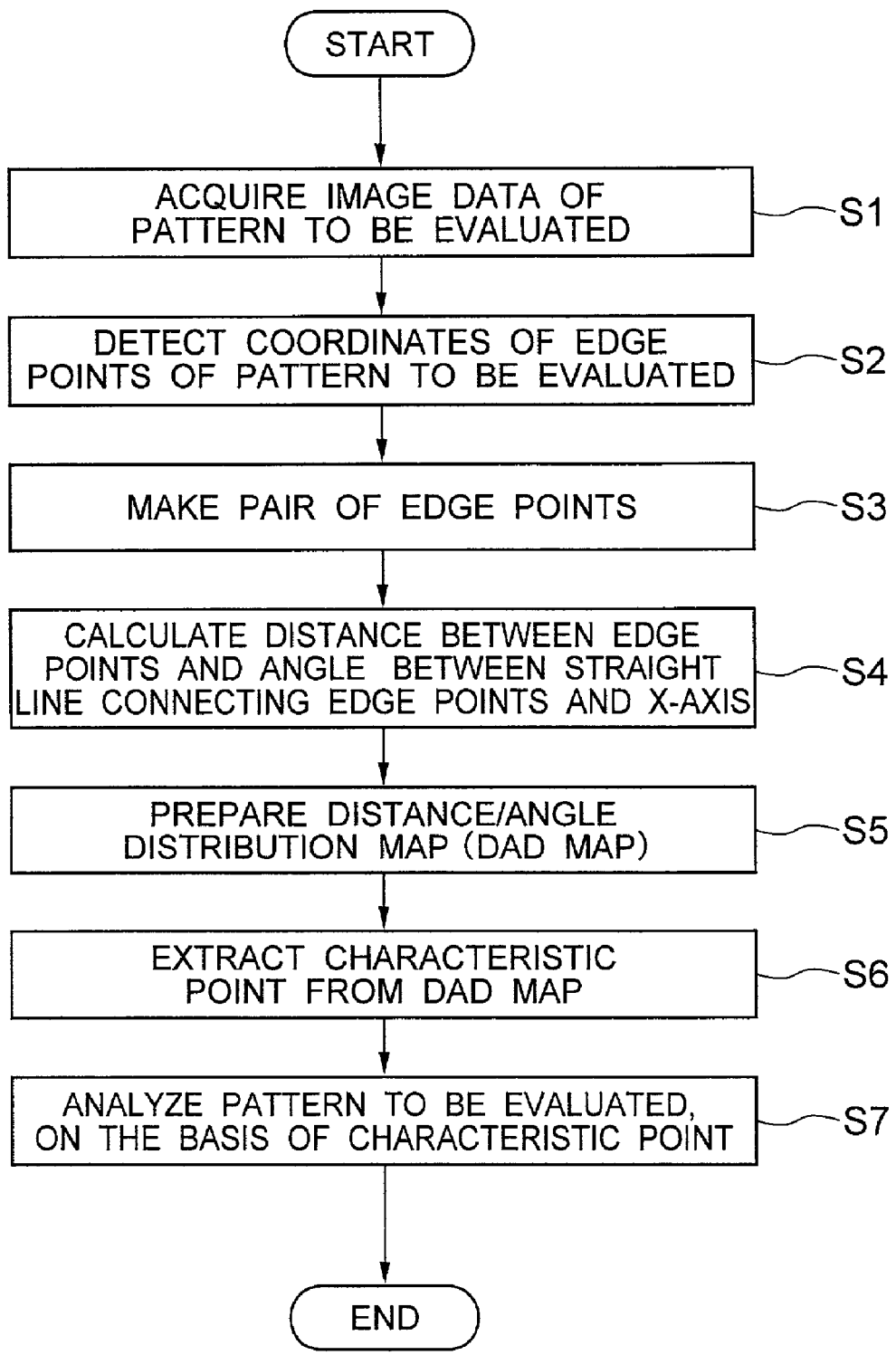
FIG. 2 is a flow chart showing a schematic procedure in the first embodiment of a pattern evaluation method according to the present invention.
Figure 3:
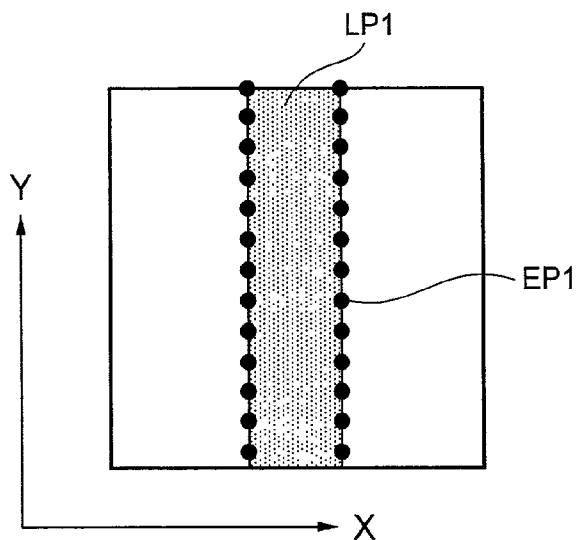
FIG. 3 is a schematic diagram showing detected edge points obtained from a line pattern by the pattern evaluation method shown in FIG. 2.
Figure 4:
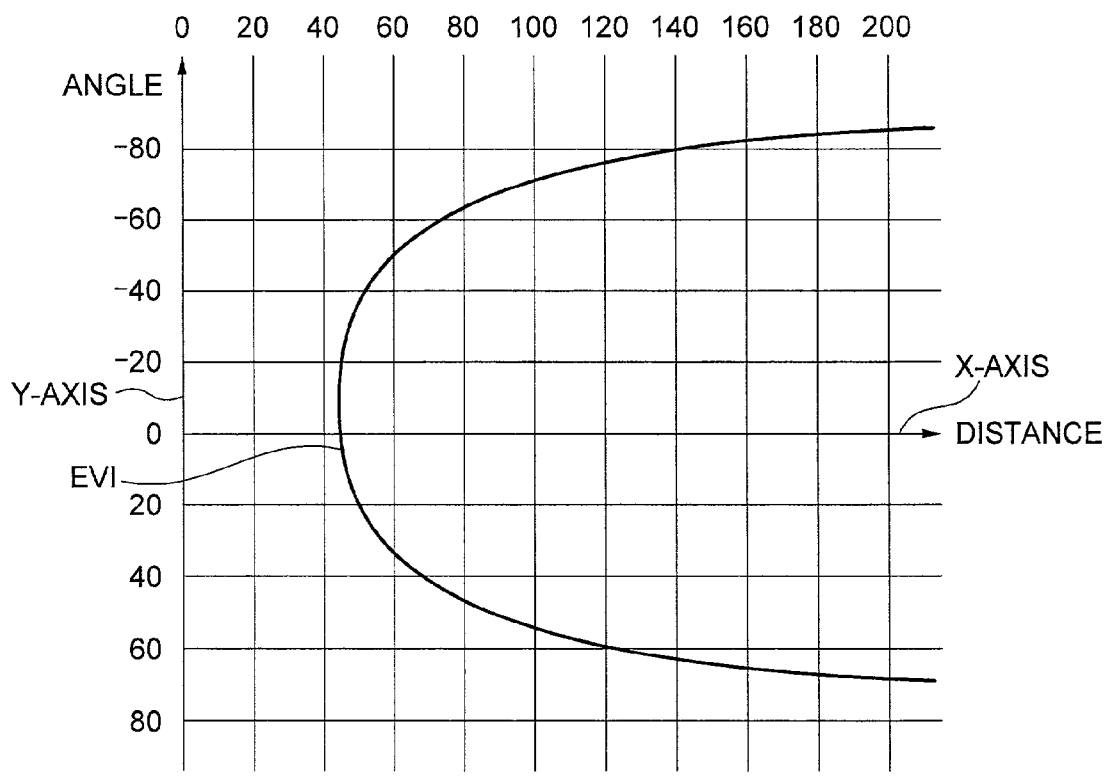
FIG. 4 is an example of a DAD map obtained from the line pattern shown in FIG. 3, by the pattern evaluation method shown in FIG. 2.

Referring to FIGS. 2 through 4, the first embodiment of a pattern evaluation method according to the present invention will be described below.

FIG. 2 is a flow chart for explaining a schematic procedure in this embodiment. FIG. 3 is a schematic diagram showing pairs of edge points obtained by processing an SEM image of a line pattern. FIG. 4 shows an example of a DAD map characterized in this embodiment.

As shown in FIG. 2, image data of a pattern serving as an object to be evaluated is first acquired from an SEM image (not shown) (step S1).

Then, the image processing part 24 recognizes edges from the acquired image data and detects coordinates of edge points constituting the edges by a known method (step S2). The schematic diagram of FIG. 3 shows a line pattern LP1 having an ideal shape, the edges of which are detected by certain algorithm. As described above, according to the conventional calculation method, pairs of edges are found in X-axis directions in FIG. 3, and an average value of distances between the pairs of edges is obtained. In this embodiment, the image processing part 24 takes all of combinations of points constituting the right edge of a line and points constituting the left edge of the line (step S3) and calculates a distance between the left and right edges in each combination and an angle of a straight line connecting these edges with respect to X-axis (step S4) to express them as a distance/angle distribution map (i.e., a DAD map) (step S5). FIG. 4 shows a DAD map expressed with respect to the line pattern shown in FIG. 3. In FIG. 4, X-axis denotes a distance between edge points and Y-axis denotes an angle of a straight line connecting a pair of edge points with respect to X-axis. The distance between edge points is expressed by the number of pixels. This point is common to the embodiments which will be described later. However, in usual measurement, the number of pixels is multiplied by a calibration constant to be converted into a unit of length to be outputted. FIG. 4 is a DAD map of an ideal straight line pattern shown in FIG. 3. Then, assuming that a line width is D, this curve mathematically has a function of $x = D/\cos y$. The coordinates of an extremal value EV1 of this function are $(D, 0)$. According to this embodiment, if an SEM image is acquired so that the central line of an ideal line pattern is parallel to Y-axis, the line width of the line pattern can be easily obtained from an intercept of the DAD map with respect to X-axis.

The above described extremal value in this embodiment represents a characteristic point which is suitable for the purpose of measurement. The work station 12 extracts this value by preparing the above described approximate curve from the DAD map (step S6).

Finally, an evaluation pattern is analyzed on the basis of the extracted characteristic points (step S7). According to this embodiment, it is analyzed that the pattern LP1 is an ideal line pattern having a line width D.

Thus, according to this embodiment, detected edge points are combined to make pairs, a DAD map is prepared with a distance between edge points, which constitutes each pair of edge points, and an angle of a straight line connecting these edges with respect to X-axis and an extremal value as one of characteristic points are extracted on the basis of the distribution map, so that it is possible to rapidly measure a pattern. In addition, since the extremal value is extracted by image-processing the DAD map, it is possible to improve a processing speed and it is possible to reduce the influence of measurement errors due to erroneous getting of edges. Thus, it is possible to precisely evaluate a pattern. The above described image processing includes at least one of a binary coding processing, a median filtering, a noise filtering or the like.

While edge points have been combined to make pairs with respect to all of detected edge points in this embodiment, edge points may be combined to make pairs with respect to part of detected edge points. This point is the same in the following embodiments.

(2) Second Embodiment

The second embodiment of a pattern evaluation method according to the present invention will be described below.

Figure 5:
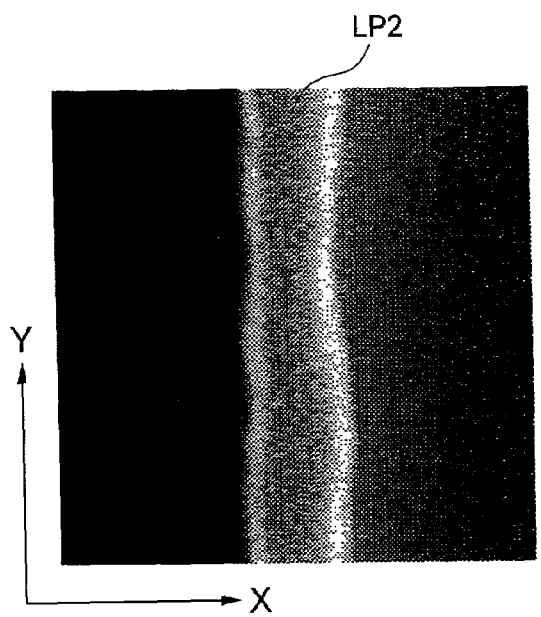
FIG. 5 is an example of an SEM image showing a line pattern wherein line widths are different in a measuring region due to working errors.

For example, like a line pattern LP2 shown in FIG. 5, there are some cases where a line pattern of an actually worked semiconductor has different line width in a measuring region due to working errors even if the line pattern has a constant line width in design. The feature of this embodiment is that characteristic points are appropriately extracted in such a pattern having the dispersion in line width.

Figure 6:
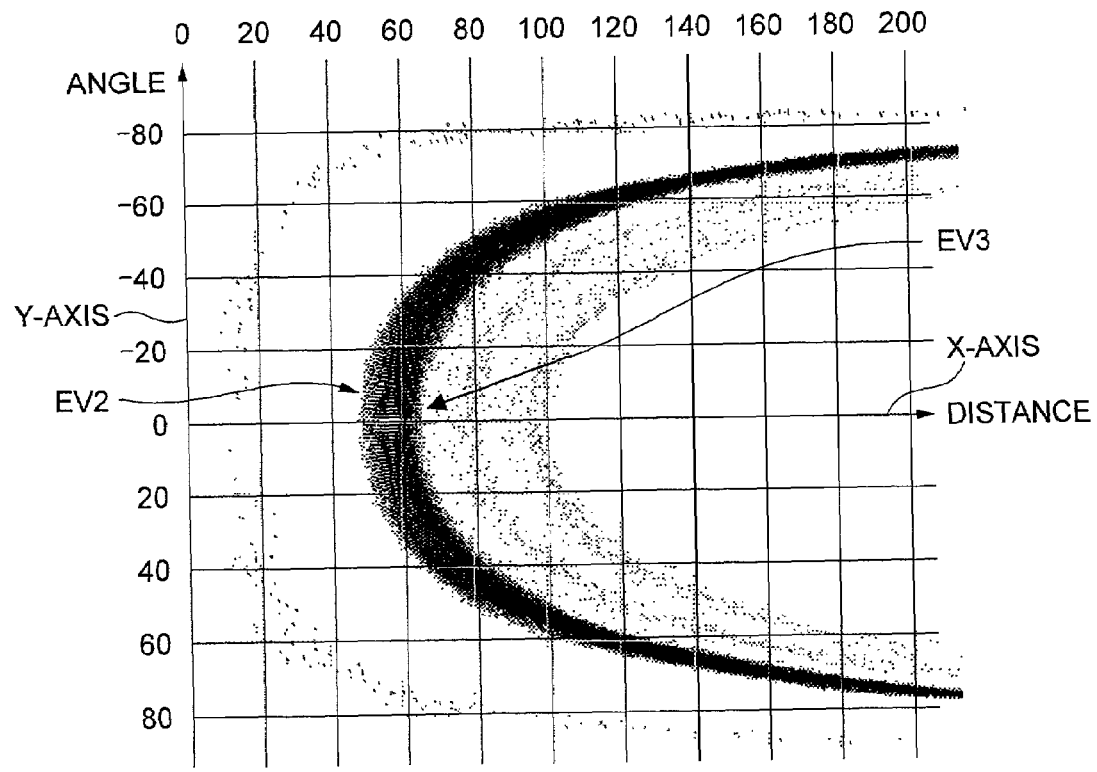
FIG. 6 is an example of a DAD map prepared by the procedure shown in FIG. 2, with respect to the line pattern shown in FIG. 5.

FIG. 6 shows an example of a DAD map prepared by the procedure shown in FIG. 2, with respect to the line pattern LP2 shown in FIG. 5. The DAD map shown in FIG. 6 is expressed as a distribution having an area. As can be clearly seen from FIG. 6, the minimum width and maximum width of the line pattern LP2 can be obtained from coordinates of a point EV2, which is the minimum value of distribution points on X-axis in the figure, and a point EV3 which is the maximum of the distribution points. The characteristic points from the DAD map may be obtained from an approximate curve having a function of x=D/cos y or maybe extracted by image-processing the DAD map in various way. At this time, if the DAD map has been stored in the image memory 28, it is possible to carry out rapid calculation or image processing.

If the line pattern LP1 shown in FIG. 3 is an ideal pattern with respect to the line pattern LP2 shown in FIG. 5, it is possible to check the specification of the line pattern LP2 by superposing the DAD map shown in FIG. 4 on the DAD map shown in FIG. 6 to compare the extremal value EVl, the minimum value EV2 and the maximum value EV3 with each other.

(3) Third Embodiment

The third embodiment of a pattern evaluation method according to the present invention will be described below.

Figure 7:
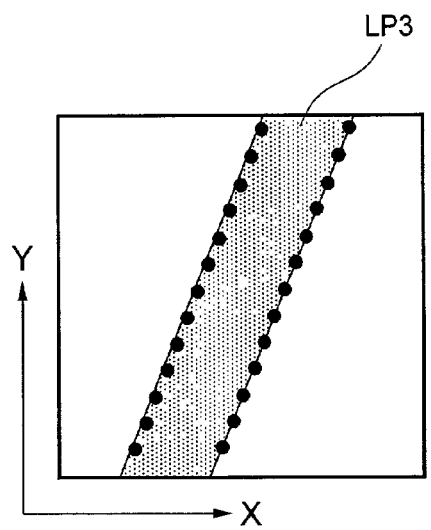
FIG. 7 is a diagram showing an example of a line pattern acquired in an SEM image so as to be inclined with respect to a reference axis.
Figure 8:
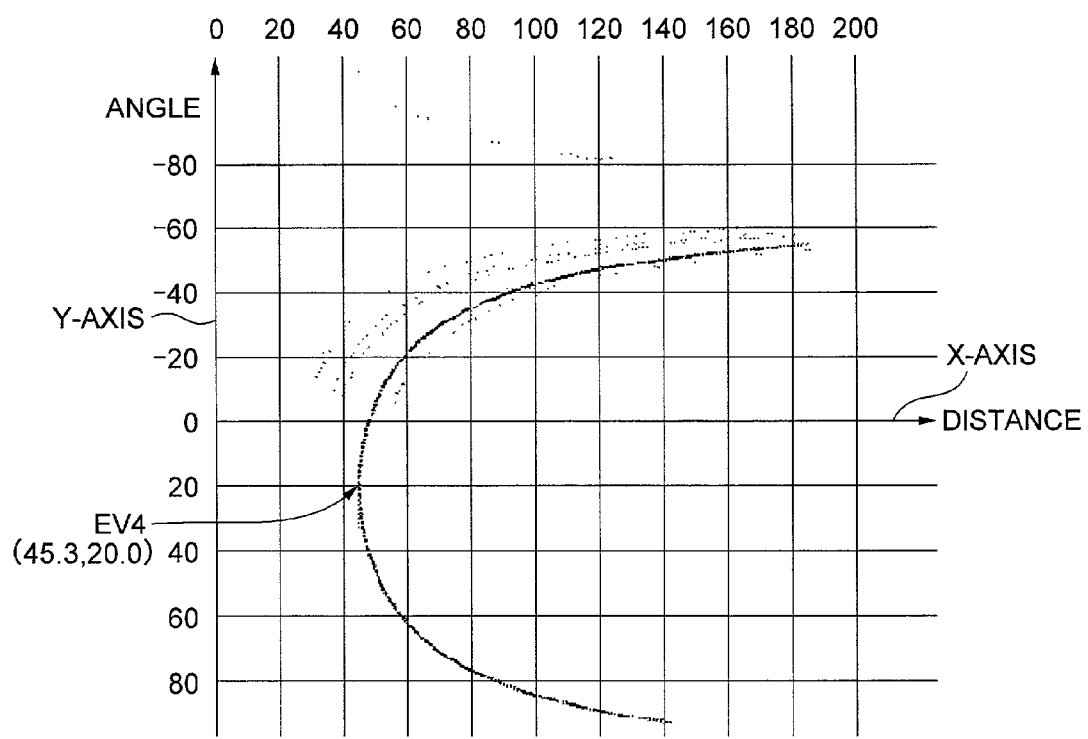
FIG. 8 is an example of a DAD map prepared from the inclined pattern shown in FIG. 7.

FIG. 7 shows a line pattern LP3 which is formed in a working process so as to be inclined or which is acquired in an SEM image acquiring process so as to be inclined with respect to a reference axis, such as X-axis or Y-axis. FIG. 8 is an example of a DAD map prepared with respect to such an inclined pattern. The line width and rotation angle of the line pattern LP3 can be obtained from coordinates of the minimum point EV4 in the DAD map. In this embodiment, it can be seen that the rotation angle of the pattern LP3 is 20.0 degrees and with 45.3 pixels.

Thus, according to this embodiment, even if a line arranged at a constant angle can not be produced due to the capability of a producing line or the like, the true line width and the rotation angle of the line can be measured without the need of any preprocessing, such as alignment.

(4) Fourth Embodiment

The fourth embodiment of a pattern evaluation method according to the present invention will be described below.

Figure 9:
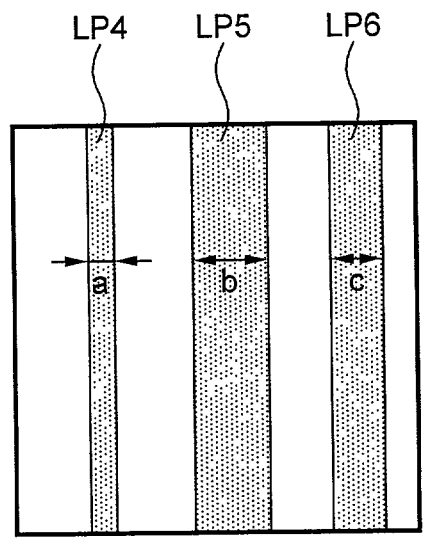
FIG. 9 is a diagram showing an example where a plurality of line patterns having different line widths exist in a same measuring region.
Figure 10:
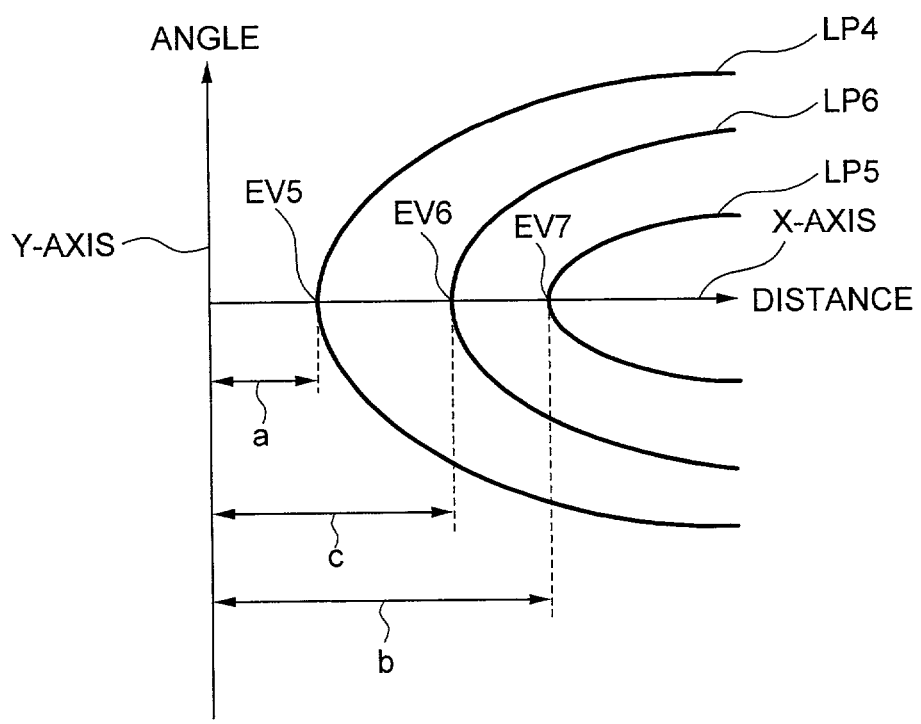
FIG. 10 is an example of a DAD map acquired from the plurality of line patterns shown in FIG. 9, by setting an inhibiting rule by a fourth embodiment of a pattern evaluation method according to the present invention.

The feature of this embodiment is that a plurality of line patterns can be simultaneously and rapidly measured. FIG. 9 shows a case where a plurality of line patterns LP4 through LP6 having different line widths exist in a same measuring region and where the edge points thereof are detected over the whole measuring region. In such a case, if all pairs of edge points are formed, information on the line and information on the space are mixed in the DAD map. For that reason, in this embodiment, an inhibiting rule for inhibiting pairing between right edge points of the lines or pairing between left edge points of the lines from being made is set to be supplied to the image processing part 24. The inhibiting rule may further inhibit pairing of edge points across a line from being made. The inhibiting processing for inhibiting these pairing of edge points can cope with various purposes of measurement if the inhibiting processing is previously carried out prior to actual measurement so that inhibiting conditions can be selected during measurement. By such an inhibiting processing, only information required for measurement can be taken out. Information from unnecessary edge points can be removed as noises. FIG. 10 shows a DAD map when the above described inhibiting rule is set. As shown in this figure, with respect to a plurality of lines, the maximum value, minimum value and minimum line width of each line pattern can be simultaneously acquired similar to a case where a single line is measured.

In addition, if the pattern evaluation method in this embodiment is applied to a case where a pattern, which is not an object to be measured, exists in a region in which a pattern to be measured exists, it is possible to exclude the unnecessary pattern from the DAD map to obtain measured values of the pattern which is to be measured. As a result, it is not required to strictly assign a measuring region prior to measurement.

While pairing of edge points between pattern edges which belong to the same pattern has been described in this embodiment, edge points may be paired between pattern edges which belong to different patterns. Thus, when a plurality of patterns are simultaneously measured, information on a pattern which is not an object to be measured, or information between respective patterns can be separated to be stored as data in the form of a DAD map. Thus, many kinds of measurement can be carried out.

(5) Fifth Embodiment

The fifth embodiment of a pattern evaluation method according to the present invention will be described below.

Figure 11:
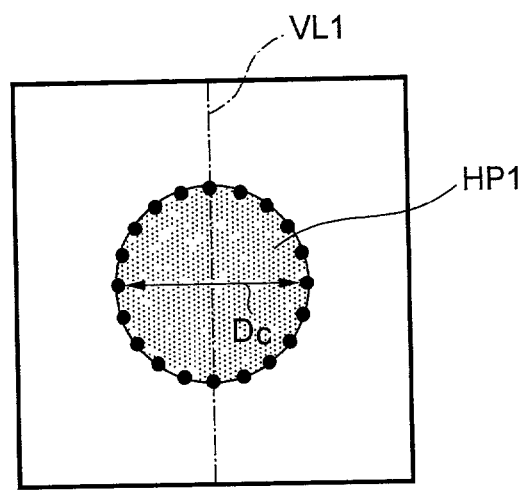
FIG. 11 is a diagram showing an example of a complete round hole pattern.
Figure 12:
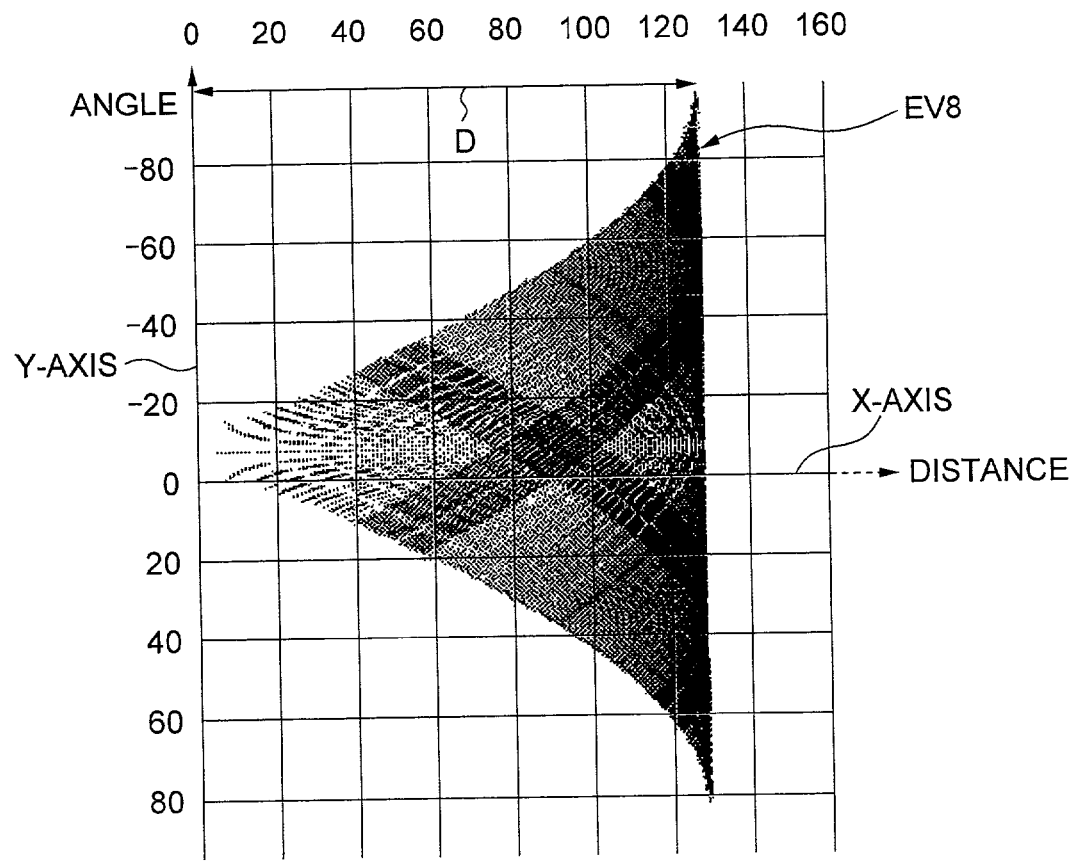
FIG. 12 is an example of a DAD map acquired from the hole pattern shown in FIG. 11, by a fifth embodiment of a pattern evaluation method according to the present invention.

This embodiment is an evaluation method when a pattern to be evaluated is a hole pattern. In the case of a hole pattern, unlike a line pattern, it is not possible to determine which side of the left and the right an edge point belongs, then a DAD map is prepared with respect to all of edge points since. However, in this embodiment, in order to save the calculation time, the obtained edge points are divided into two groups by a vertical line VL1 passing through the center of gravity of the pattern as shown in FIG. 11. This vertical line will be hereinafter referred to as an edge dividing line. In this embodiment, the edge dividing line is derived from X component of the center of gravity of the pattern. However, the edge dividing line may be defined by other appropriate line, e.g., a line which is coincident with the principal axis of the pattern. Thus, in addition to reduce the calculation time to half, information on the concave portion of the pattern can also be detected as will be described later. The hole pattern HP1 shown in FIG. 11 is a perfect circle having a diameter D. In this case, a DAD map is prepared as shown in FIG. 12. The diameter Dc of the hole pattern HP1 can be obtained from the maximum value D of X coordinate.

(6) Sixth Embodiment

The sixth embodiment of a pattern evaluation method according to the present invention will be described below.

The feature of this embodiment is that characteristic points are precisely extracted when a pattern to be evaluated is an elliptic pattern.

Figure 13:
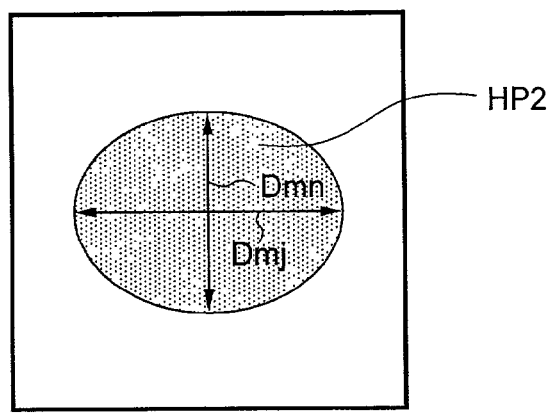
FIG. 13 is a diagram showing an example of an elliptic pattern.
Figure 14:
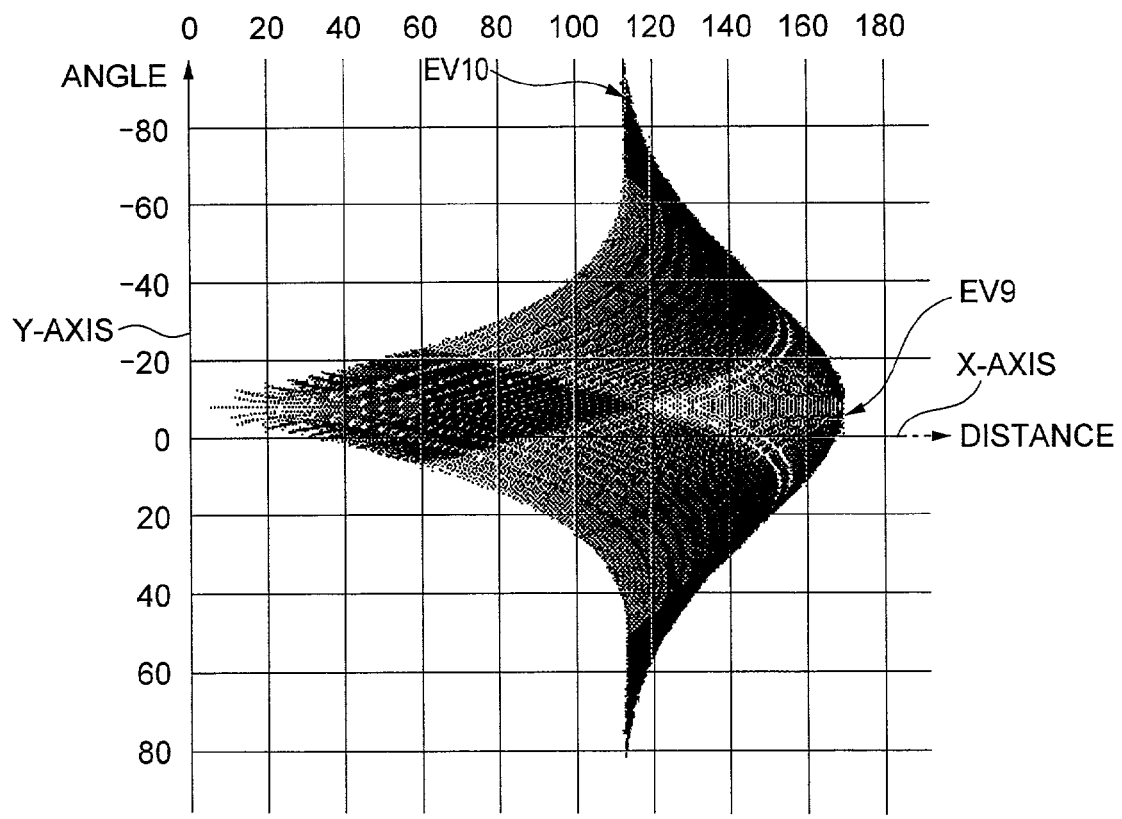
FIG. 14 is an example of a DAD map obtained from the elliptic pattern shown in FIG. 13.

FIG. 13 shows an example of an elliptic pattern. An example of a DAD map obtained from such an elliptic pattern HP2 is shown in FIG. 14. In this figure, a characteristic point EV9 denotes the distance and angle of the major axis of the ellipse and a characteristic point EV10 denotes the distance and angle of the minor axis of the ellipse. In general, these values are regarded as the maximum and minimum ferret diameters of the hole pattern, respectively. In this embodiment, after the DAD map stored in the image memory 28 is smoothed by the image processing part 24, a binary coding thereof is carried out, and isolated points on the DAD map are removed by a median filtering to finally obtain EV9 and EV10. According to this embodiment, even if dummy edge points are caused by edge detection errors by such an image processing, the influence thereof can be removed to carry out precise measurement.

(7) Seventh Embodiment

The seventh embodiment of a pattern evaluation method according to the present invention will be described below.

Figure 15:
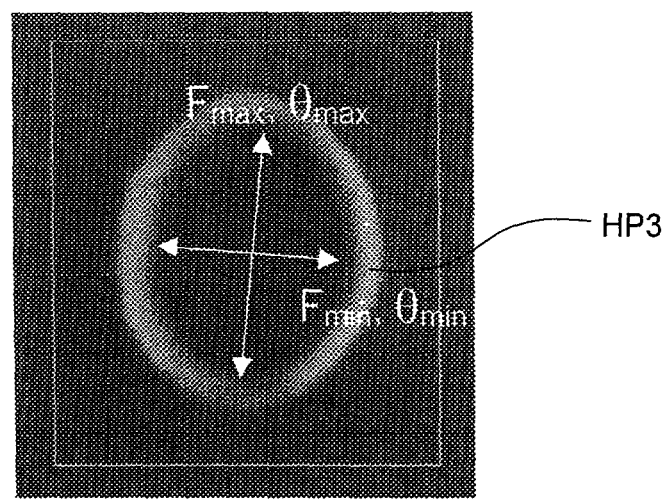
FIG. 15 is a diagram showing an example of a hole pattern formed with distortion and roughness due to working errors in a lithography process for a semiconductor.
Figure 16:
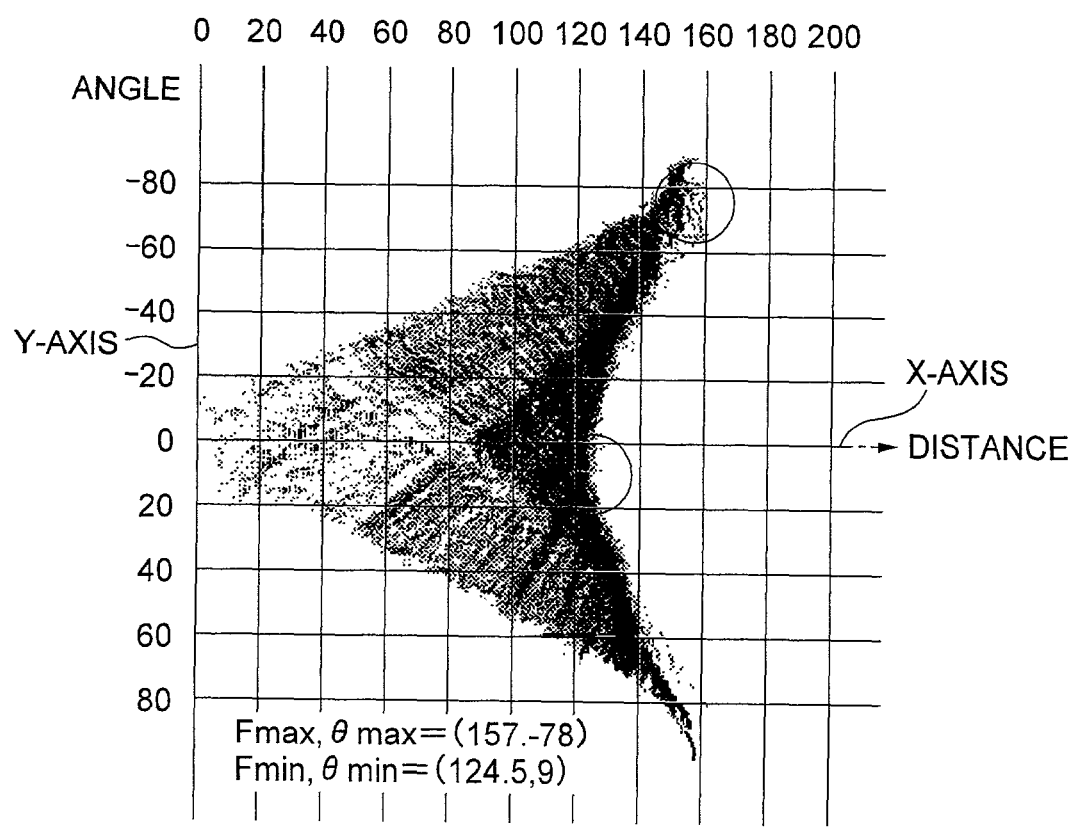
FIG. 16 is an example of a DAD map obtained from the hole pattern shown in FIG. 15.

FIG. 15 shows an example of a hole pattern formed in a lithography process in a semiconductor fabrication. In the hole pattern HP3 shown in this figure, distortion and roughness along the periphery are caused by the influence of various working errors. An example of a DAD map prepared with respect to the hole pattern HP3 shown in FIG. 15 is shown in FIG. 16. In this figure, information on distortion and roughness portions of the pattern is condensed on the right boundary line of the distribution. This right boundary line can be obtained by a usual analysis, such as the Fourier analysis. Moreover, a certain kind of approximate circle can be acquired by approximating the right boundary line by a straight line parallel to Y-axis. In addition, an intensity value is added to each distribution point in the DAD map. Therefore, in place of the above described method using the boundary line as a characteristic curve, a curve obtained by approximating and connecting the points of the maximal values in the distribution may be used, or a curve obtained by approximating and connecting points having a certain intensity or more may be used. Thus, if gradation values indicative of density are added to data in the DAD map or data in the vicinity of the maximal value to provide a difference in density in the whole DAD map or a region in the vicinity of the maximum value, it is possible to easily acquire information corresponding to roughness of the pattern. These points are the same in the eighth, ninth, thirteenth and fourteenth embodiments which will be described later.

(8) Eighth Embodiment

The eighth embodiment of a pattern evaluation method according to the present invention will be described below.

Figure 17:
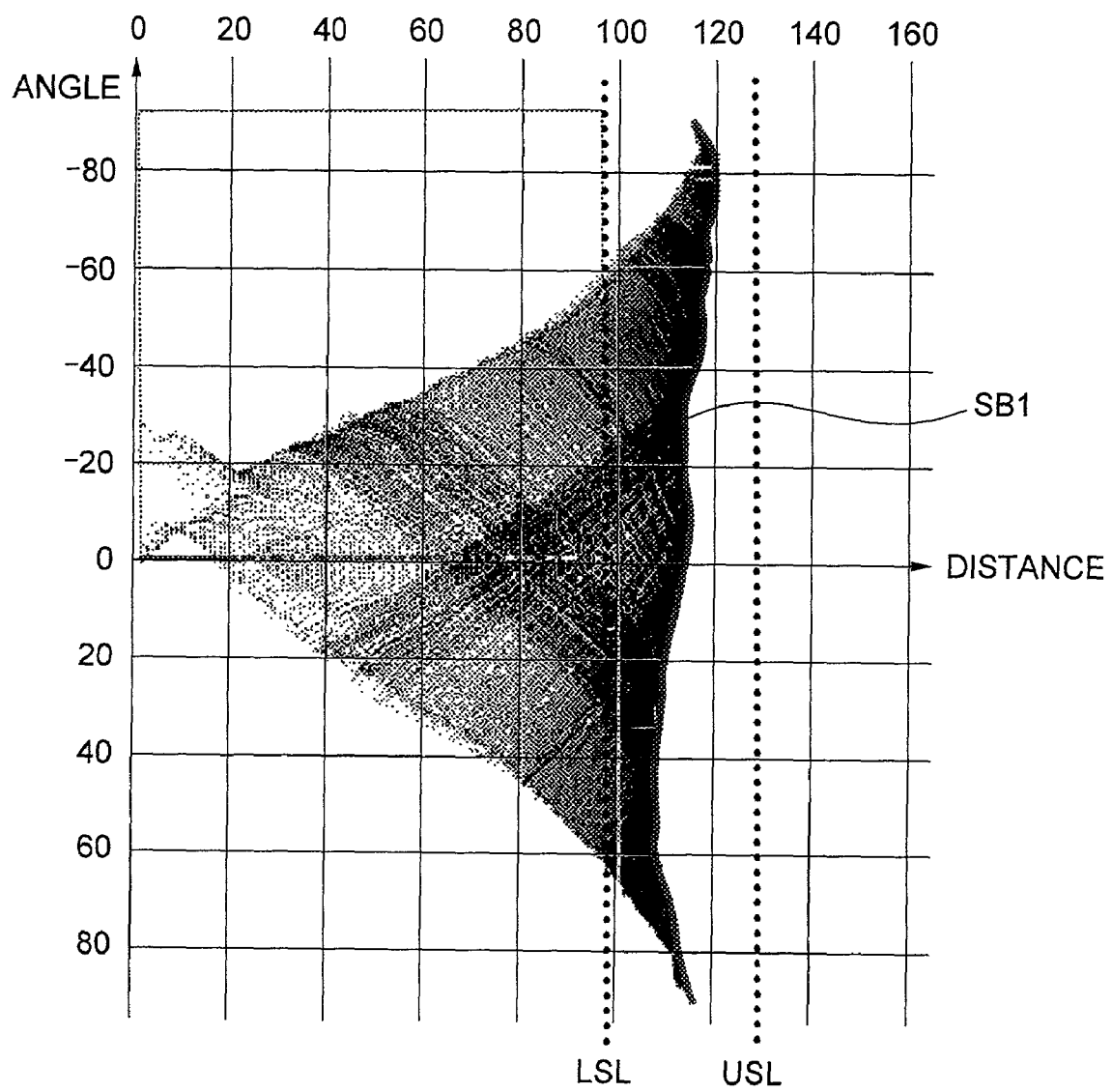
FIG. 17 is a diagram expressing a specification with respect to the diameter of a hole pattern on a DAD map.

The feature of this embodiment is that the specification of a pattern to be evaluated is checked by using a DAD map. For example, if an object to be measured is a hole pattern and if this hole pattern has a LSL (lower specification limit) and/or a USL (upper specification limit), these specifications are expressed on a DAD map by a band region SBI as shown in, e.g., FIG. 17. Thus, the specifications can be instantaneously checked by calculating an including relationship between the right boundary line and the band region SBI. Furthermore, in this embodiment, the band region is used since the specification with respect to a perfect circle is adopted. However, by determining this by actual products, it is possible to instantaneously check a further complicated specification.

(9) Ninth Embodiment

The ninth embodiment of a pattern evaluation method according to the present invention will be described below.

Figure 18:
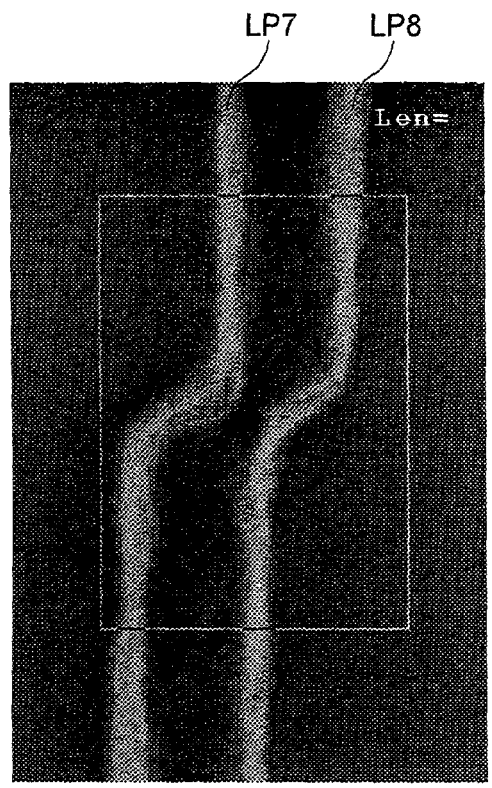
FIG. 18 is a diagram showing an example of an SEM image of a bent line pattern.
Figure 19:
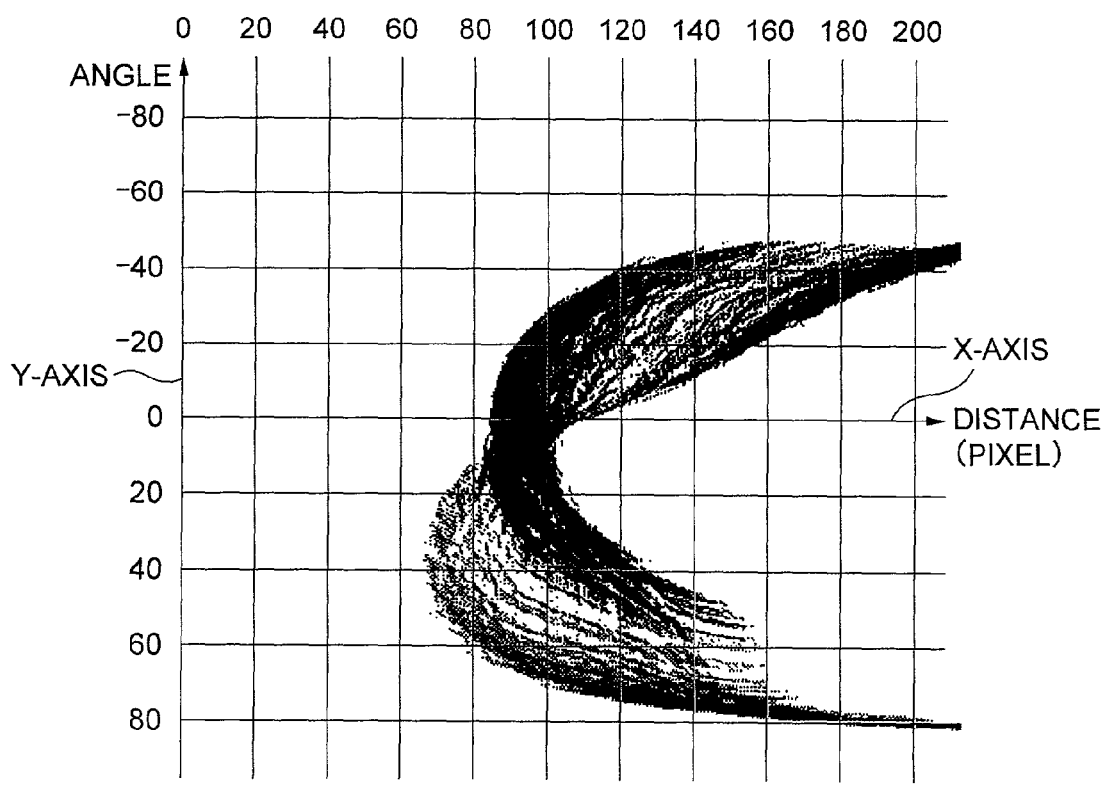
FIG. 19 is a DAD map obtained from the bent line pattern shown in FIG. 18.
Figure 20:
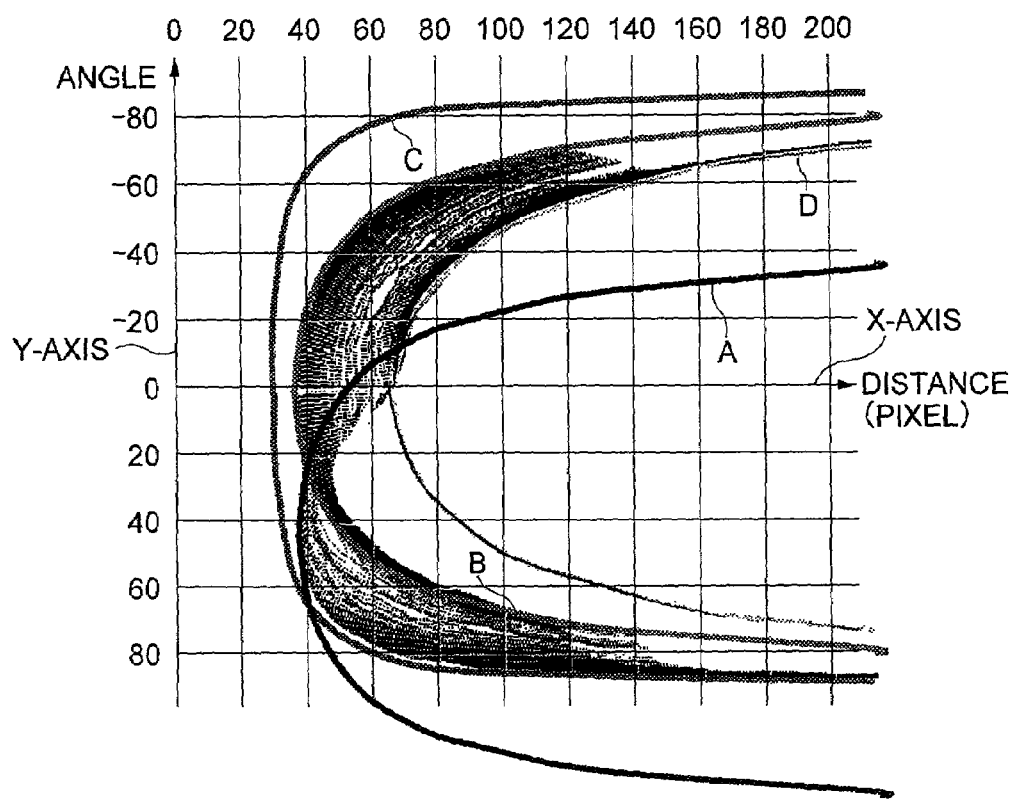
FIG. 20 is a diagram showing a method for analyzing information on a line pattern on the basis of the DAD map shown in FIG. 19.
Figure 21:
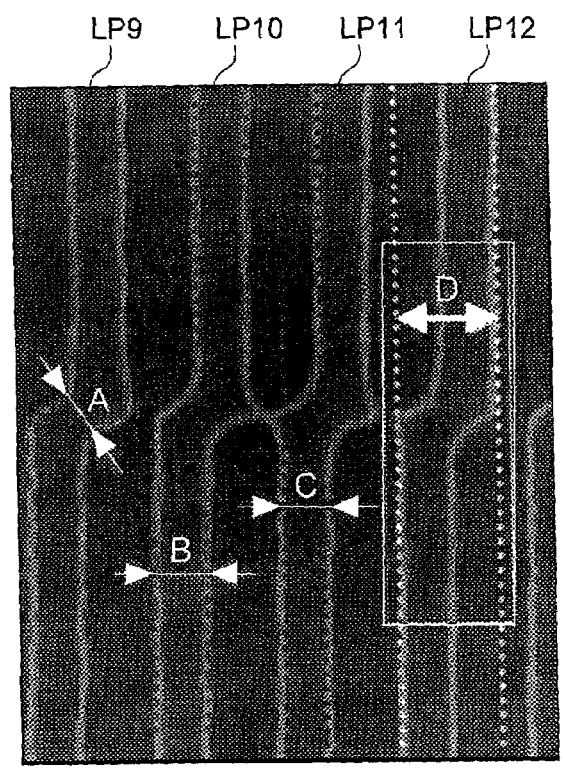
FIG. 21 is a diagram showing measured information on another line pattern located around the line pattern shown in FIG. 16, which is led by the analyzing method shown in FIG. 20.

The feature of this embodiment is that a bent line pattern is also precisely measured. An example of such a bent line pattern is shown in FIG. 18. Line patterns LP7 and LP8 shown in this figure are patterns formed in, e.g., a semiconductor fabricating process. In particular, it is required to measure the dimension of bent part (if it is bent). FIG. 19 is a DAD map of the line patterns LP7 and LP8. The dimension of the bent part can be measured from the minimum value of the left boundary line in the DAD map. In this embodiment, the distance in the bent part was calculated to be 68 pixels. In addition, if it is assumed that the DAD map of FIG. 19 comprises four curved portions A, B, C and D shown in FIG. 20 and if the respective curves are approximated by a function of x=D/cos y, the various dimensions of other line patterns LP9 through LP12 as shown in, e.g., FIG. 21, which are arranged around the line patterns LP7 and LP8 of FIG. 18, can be measured. For example, from approximate curves B and C in FIG. 20, the line width of a portion other than the bent part of the line patterns LP10 and LP11 can be measured. Moreover, from an approximate curve D in FIG. 20, the width of the line pattern LP12 which is caused to occupy as a whole due to the bent part can also be measured.

(10) Tenth Embodiment

The tenth embodiment of a pattern evaluation method according to the present invention will be described below.

The feature of this embodiment is that information on a concave portion is acquired when a hole pattern has the concave portion in its peripheral portion.

Figure 22:
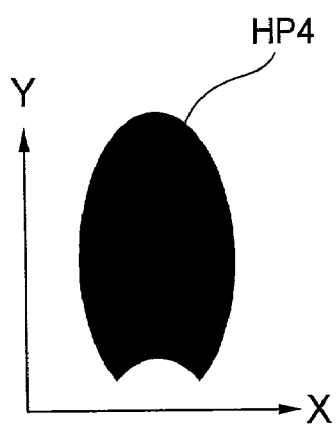
FIG. 22 is an SEM image showing an example of a pattern having a concave-curved profile.

FIG. 22 is an SEM image showing an example of a pattern having a concave-curved profile. With respect to such a hole pattern HP4, FIG. 23 shows a DAD map prepared by taking a dividing line for detecting edge points in a direction of 0 degree with respect to X-axis in FIG. 22 and FIG. 24 shows a DAD map prepared by taking the dividing line in a direction of 90 degrees with respect to X-axis in FIG. 22.

Figure 23:
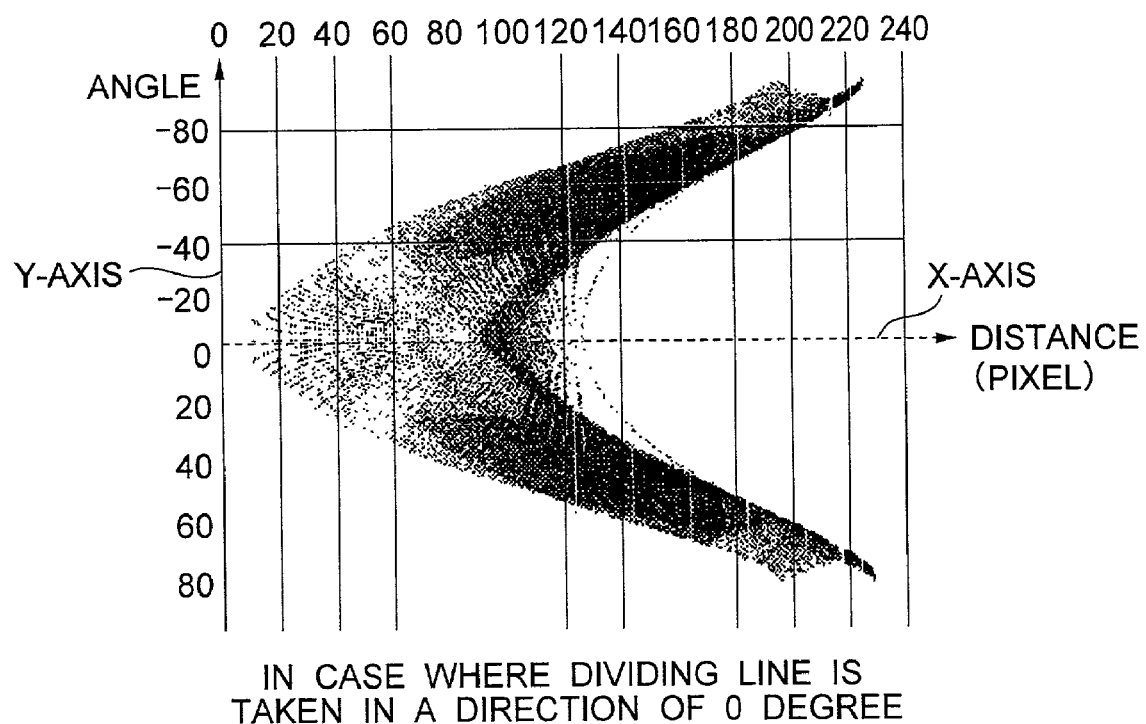
FIG. 23 is a DAD map prepared by taking a dividing line for the pattern shown in FIG. 22, in a direction of 0 degree with respect to X-axis shown in FIG. 22.
Figure 24:
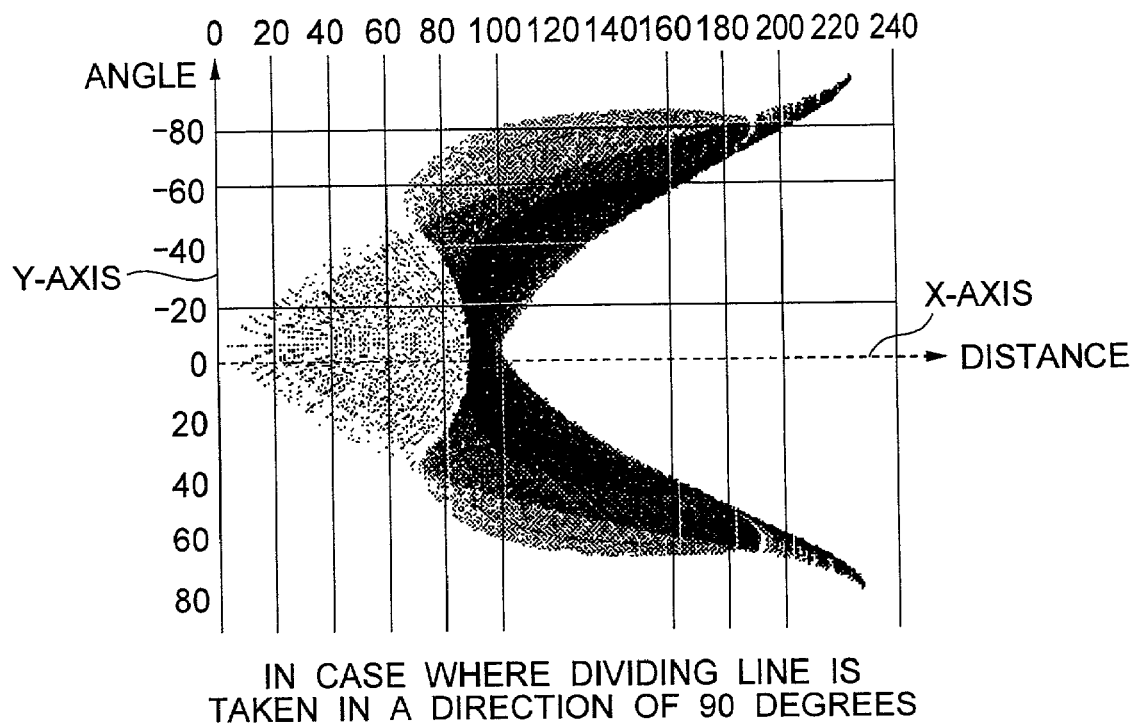
FIG. 24 is a DAD map prepared by taking a dividing line for the pattern shown in FIG. 22, in a direction of 90 degrees with respect to X-axis shown in FIG. 22.

As can be clearly seen from the comparison of FIG. 23 with FIG. 24, the DAD map varies in accordance with the gradient of the dividing line due to the existence of edge points on the profile of the concave portion of the pattern even if the pattern is the same. In this embodiment, the dividing line is rotated by a rough step, such as 0 degree and 90 degrees. However, the step may be decreased to 10 degrees or further to 1 degree. On the basis of distribution maps obtained by the respective dividing lines, information on concave portion existing on the peripheral edge of the pattern in arbitrary directions can be measured. In this case it is preferable that the DAD map is expressed in a three-dimensional space by taking the angle of the dividing line with respect to Z-axis t and then characteristic points are extracted to measure information on the concave portion of the pattern.

(11) Eleventh Embodiment

The eleventh embodiment of a pattern evaluation method according to the present invention will be described below. The feature of this embodiment is that two DAD maps obtained by two SEM images are processed.

Figure 25:
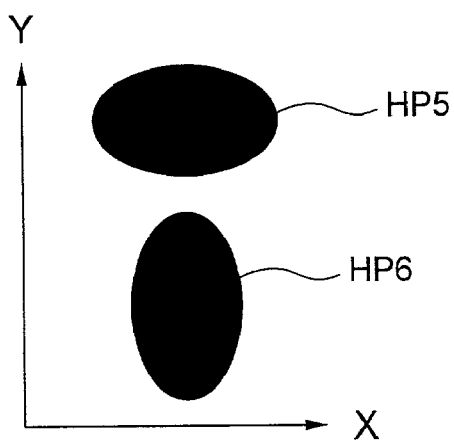
FIG. 25 is an example of an SEM image obtained from two hole patterns.

FIG. 25 shows an example of SEM images obtained from two hole patterns, respectively. In this embodiment, even if two hole patterns HP5 and HP6 may exist in separate place in the same image, or may exist in separate images.

Figure 26A:
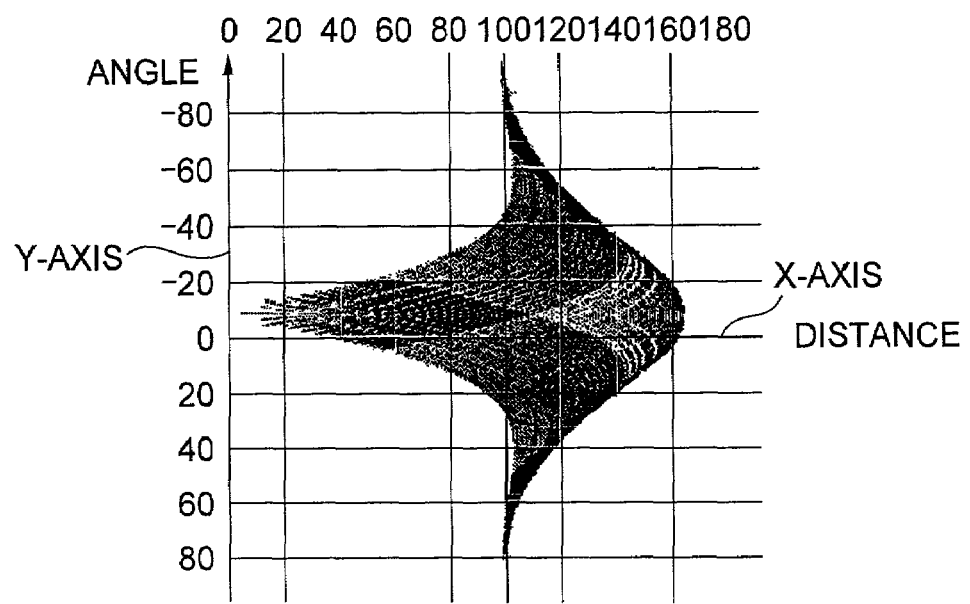
FIG. 26A is a DAD map of a hole pattern HP5 shown in FIG. 25.
Figure 26B:
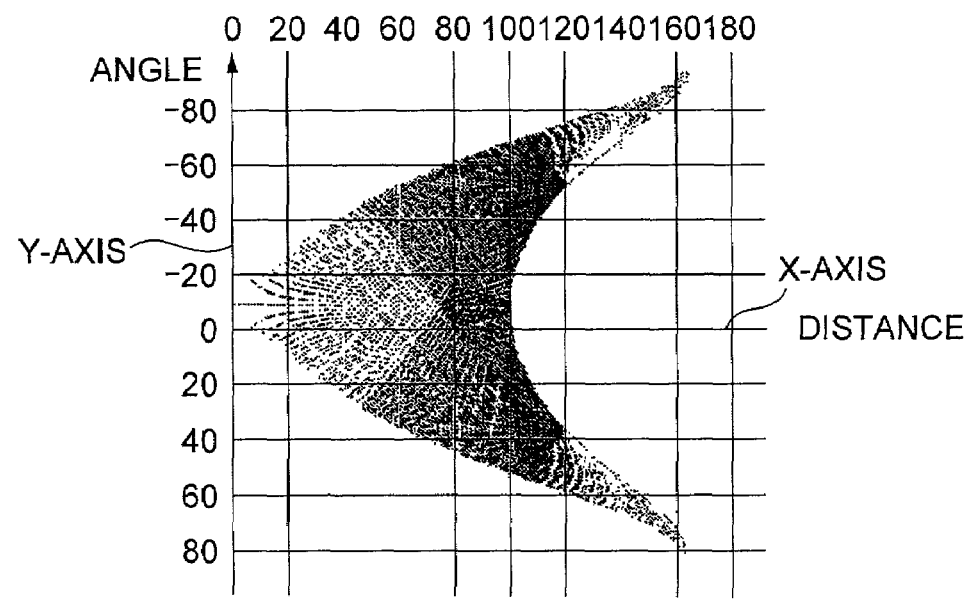
FIG. 26B is a DAD map of a hole pattern HP6 shown in FIG. 26.
Figure 27A:
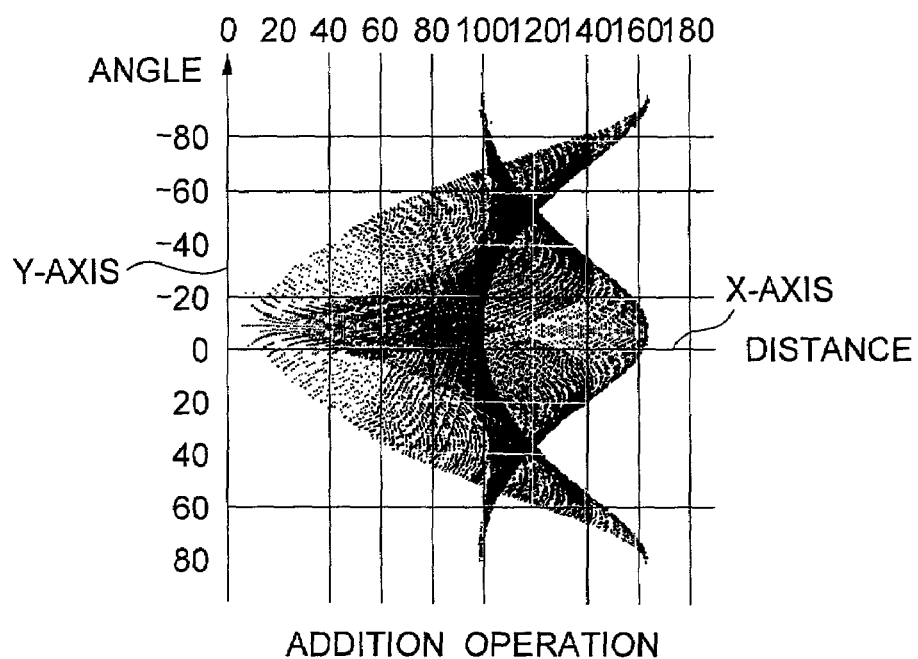
FIG. 27A is a diagram showing the results of addition operation with respect to the DAD maps shown in FIGS. 26A and 26B.
Figure 27B:
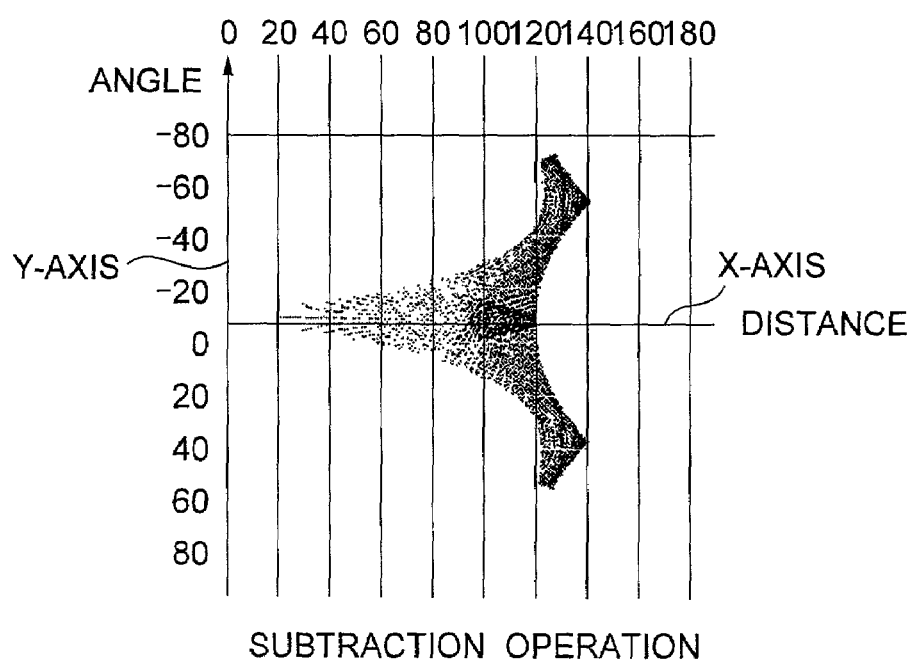
FIG. 27B is a diagram showing the results of subtraction operation with respect to the DAD maps shown in FIGS. 26A and 26B.

The DAD maps of these patterns HP5 and HP6 are shown in FIGS. 26A and 26B, respectively. Furthermore, these DAD maps are separately stored in separate memory regions of the image memory 28 of the pattern evaluation system 2 shown in FIG. 1. Then, these DAD maps are image-processed by the image processing part 24. FIGS. 27A and 27B show the results of addition and subtraction with respect to the DAD maps of FIGS. 26A and 26B. According to this embodiment, the difference between the two hole patterns HP5 and HP6 can be quantified on the basis of the results of operations shown in FIG. 27. In FIG. 25, the two hole patterns HP5 and HP6 are isolated from each other, and the major axis thereof are orthogonal to each other. However, as described above, this only shows the results of expression after the separately acquired SEM images are thus arranged. In fact, for example, there are some cases where the hole pattern HP6 is included in the hole pattern HP5. As shown in FIG. 27, by processing the DAD maps obtained from these SEM maps, the positional relationship therebetween can be clearly known. Furthermore, in this embodiment, the difference between the patterns is obtained by simply processing the images. However, after the respective DAD maps are binary-coded, the work station 12 may carry out a logical operation, such as AND or OR, with respect to the binary-coded DAD maps. Alternatively, when the difference between the DAD maps is taken, a sign serving as the results of operation may be expressed by, e.g., a difference in color, to be displayed on the output unit 18.

(12) Twelfth Embodiment

The twelfth embodiment of a pattern evaluation method according to the present invention will be described below.

In addition to the above described usual DAD map preparing procedure, in the procedure for forming pairs of edge points, information indicative of the positional relationship of the respective pairs of edge points on an actual plane, e.g., information on coordinates of the center of the paired edge points, is obtained, and this information, together with information on distance and angle of the pairs of edge points, is stored in the image memory 28 (see FIG. 1) as data. Thus, the pairs of edge points expressed by points on the DAD map are returned to the actual plane by using the additional positional information, so that it is possible to easily restore the original shape of the pattern.

(13) Thirteenth Embodiment

The thirteenth embodiment of a pattern evaluation method according to the present invention will be described below.

The feature of this embodiment is that DAD maps obtained from two patterns are synthesized to extract relative characteristic points of the respective patterns on the basis of the synthesized DAD map.

As an example of this point, two hole patterns HP5 and HP6 shown in FIG. 25 will be described below. Furthermore, as described above, these hole patterns may be arranged in separate places in the same image, or in separate images.

Figure 28:
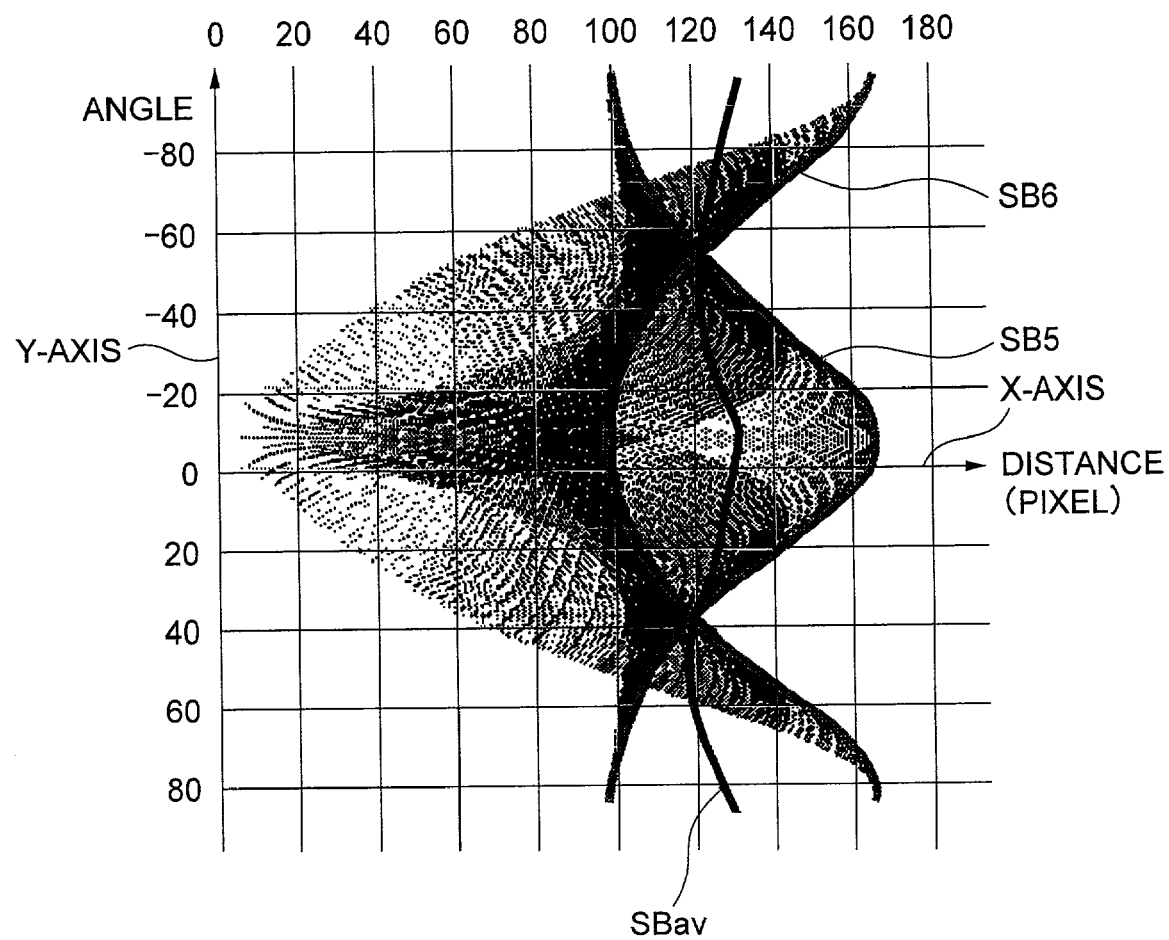
FIG. 28 is a DAD map for explaining a thirteenth embodiment of a pattern evaluation method according to the present invention.

The DAD maps of the hole patterns HP5 and HP6 are shown in FIGS. 26A and 26B, respectively. In this embodiment, as shown in FIG. 28, the characteristics of the respective patterns, e.g., the boundary lines SB5 and SB6 of the respective DAD maps, are first detected from the DAD maps. Then, from the results, an average boundary line SBav is obtained. Information on measurement obtained from the average boundary line SBav is a certain kind of equalized information of the separate hole patterns HP5 and HP6. In addition, by calculating the dispersion of the boundary lines SB5 and SB6 of the respective pattern by using the average boundary line SBav as a reference, the dispersion in shape of the respective patterns HP5 and HP6 can be quantified.

(14) Fourteenth Embodiment

The fourteenth embodiment of a pattern evaluation method according to the present invention will be described below.

The feature of this embodiment is that image data of a series of time-varied SEM images is acquired to sequentially prepare DAD maps to monitor the variation in characteristic point of a pattern.

Figure 29:
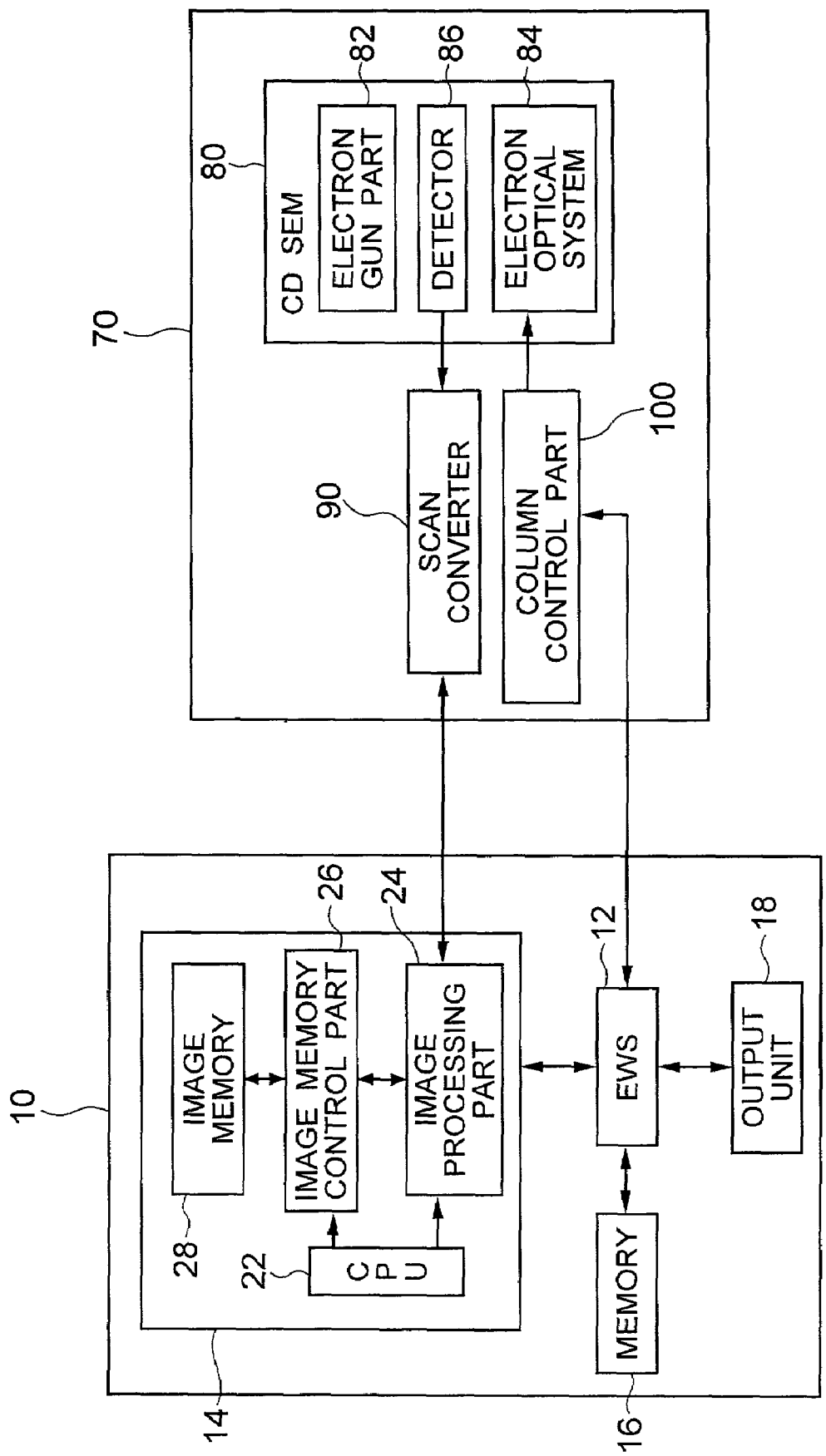
FIG. 29 is a block diagram for explaining a fourteenth embodiment of a pattern evaluation method according to the present invention.

FIG. 29 is a block diagram for explaining a pattern evaluation method in this embodiment. FIG. 29 shows an electron beam system 70 in addition to the pattern evaluation system 10 shown in FIG. 1. The electron beam system 70 comprises a CDSEM 80, a scan converter 90 and a column control part 100. The CDSEM 80 includes an electron gun part 82 for emitting electron beams to a sample, an electron optical system 84 for controlling the trajectory of electron beams to irradiate the sample with the electron beams, and a detector 86 for detecting a secondary electron, a reflected electron and a backscattered electron which generate from the sample due to irradiation of the electron beams. The column control part 100 is connected to the work station 12 of the pattern evaluation system 1 and the electron optical system 84 of the CDSEM 80. The scan converter 90 is connected to the image processing part 24 of the pattern evaluation system 1 and the detector 86 of the CDSEM 80 and converts the secondary electron, the reflected electron and the backscattered electron which are supplied from the detector 86 to a digital signal to form an SEM image data of a pattern on the surface part of the sample.

For example, when a hole pattern is used for column-adjusting the electronic optical system 84 of the CDSEM 80, if various parameters, such as stig, are varied, the shape of the hole on the SEM image obtained from the detector 86 via the scan converter 90 varies by electron beam aberration. By using the above described pattern evaluation method, the time variation of the shape of the hole pattern can be followed up via the DAD map in real time. If the results of follow-up are fed back to the various parameters of the electron optical system 84 via the column control part 100 by means of the work station 12 of the pattern evaluation system 10, it is possible to easily column-adjust electron beams.

For example, if the pattern formed on the surface of the sample is a perfect circle, the column adjustment may be carried out so that the boundary line is a straight line in the DAD map (see FIG. 12). The above described procedure should not be limited to the CDSEM system. For example, the above described procedure can be applied to a case where circular beams are monitored as a character projection in an electron beam exposure system.

(15) Fifteenth Embodiment

The fifteenth embodiment of a pattern evaluation method according to the present invention will be described below.

The feature of this embodiment is that it is possible to simultaneously and rapidly measure a plurality of patterns even if the plurality of patterns exist in a same image.

Figure 30A:
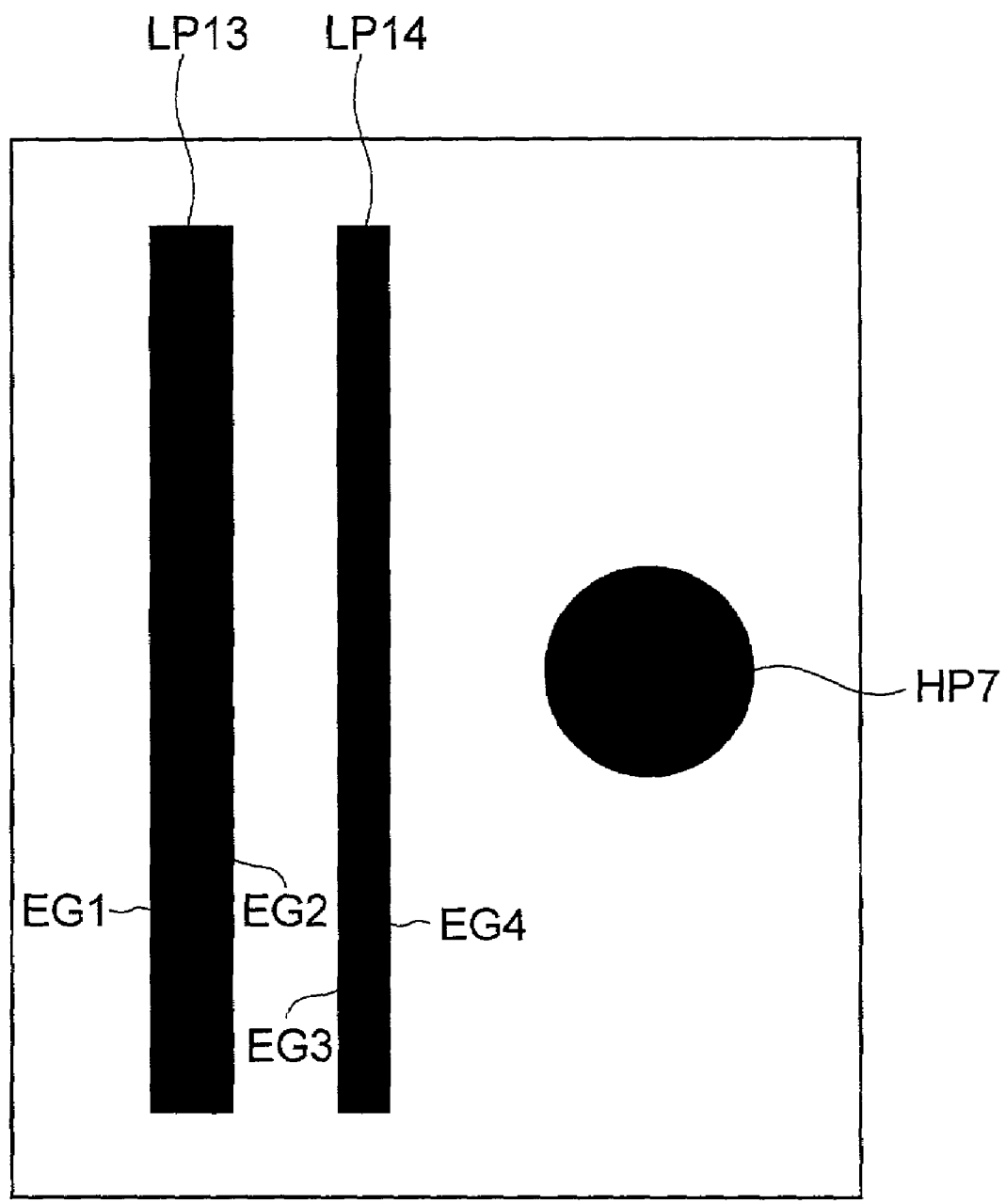
FIG. 30A is a diagram showing an image wherein a plurality of patterns exist in a same region.
Figure 30C:
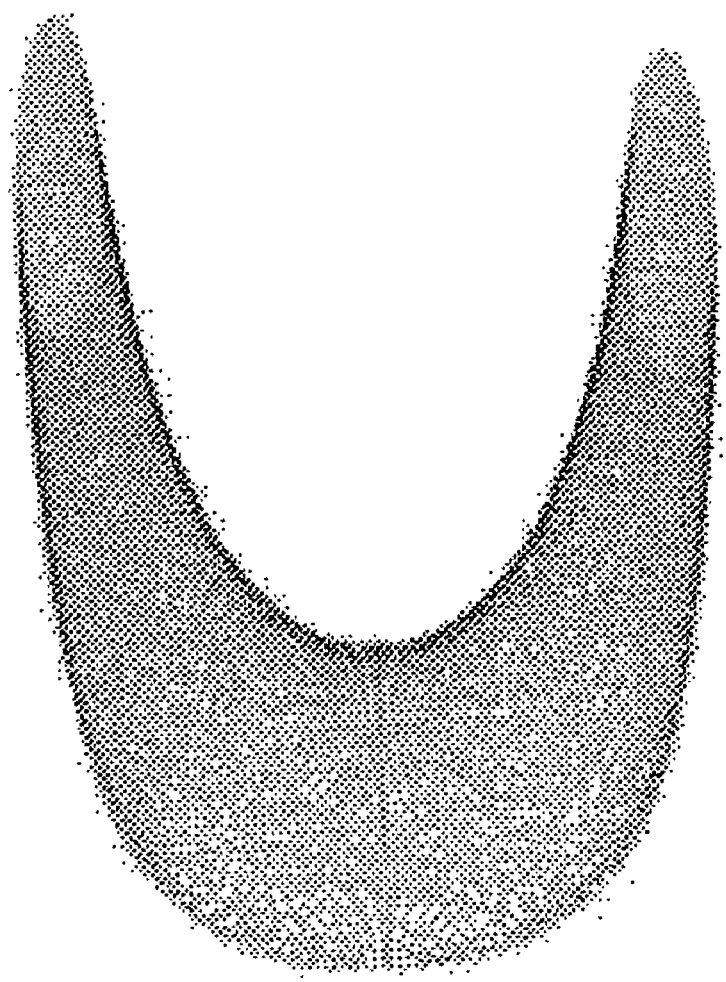
FIG. 30C is a DAD map of the edge groups EG4 and EG5 shown in FIG. 30B.
Figure 30B:
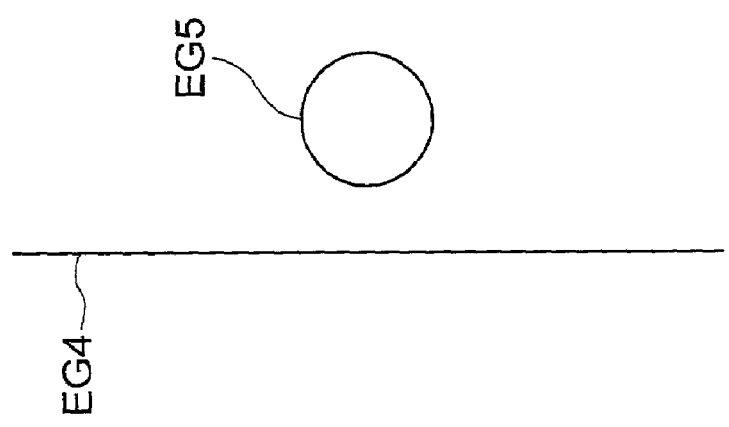
FIG. 30B is a diagram schematically showing an edge group EG4 of a sequence of right edge points of a line pattern LP14 and an edge group EG5 of a sequence of edge points of a hole pattern HP7 in FIG. 30A.

FIG. 30A shows an example of an image in which a plurality of patterns co-exist. FIG. 30A shows a case where two line patterns LP13 and LP14 having different line widths and a single hole pattern HP7 exist in a same measuring region and where edge points of these patterns are detected over the whole measuring region. In such a case, if all of edge points are paired to display the results on the DAD map, information from each pattern is mixed, so that it is difficult to extract the characteristic of the DAD map. In this embodiment, adjacent edge points are first grouped to treat each of the obtained edge point groups as an edge group, and then, a DAD map is formed for every edge group. As a grouping method, in addition to a processing for simply classifying edge points existing within a predetermined distance into the same group, there may be added a complicated processing for following up edge points to divide the edge points into two groups at its vertex when the trajectory thereof is curved at an angle greater than a predetermined angle. Thus, it can cope with a case where patterns cross each other. In the case of FIG. 30A, five edge groups EG1 through EG5 exist on the edges of three patterns LP13, LP14 and HP7 respectively, and one DAD map can be produced by one edge group in a closed curve such as a hole pattern HP7, so that the number of the kind of the DAD maps is (5×4)/2+1=11. FIG. 30B schematically shows the edge group EG4 of the sequence of right edge points of the line pattern LP14 shown in FIG. 30A, and the edge group EG5 of the sequence of edge points of the hole pattern HP7 shown in FIG. 30A. FIG. 30C shows a DAD map of the edge groups EG4 and EG5. FIG. 30D schematically shows the edge groups EG1 through EG4 of the line patterns LP14 and LP15 shown in FIG. 30A. FIG. 30E shows DAD maps which are prepared between EG1, EG2, EG3 and EG4 and which are superposed for convenience. Thus, when the line widths or the space widths are not equal to each other, even if the DAD maps are superposed, there is no problem. On the other hand, if the line widths or space widths are equal to each other, the DAD map degenerates. With respect to a measuring method for obtaining average information on a plurality of patterns in an image using this property, see the above described thirteenth embodiment.

Figure 30G:
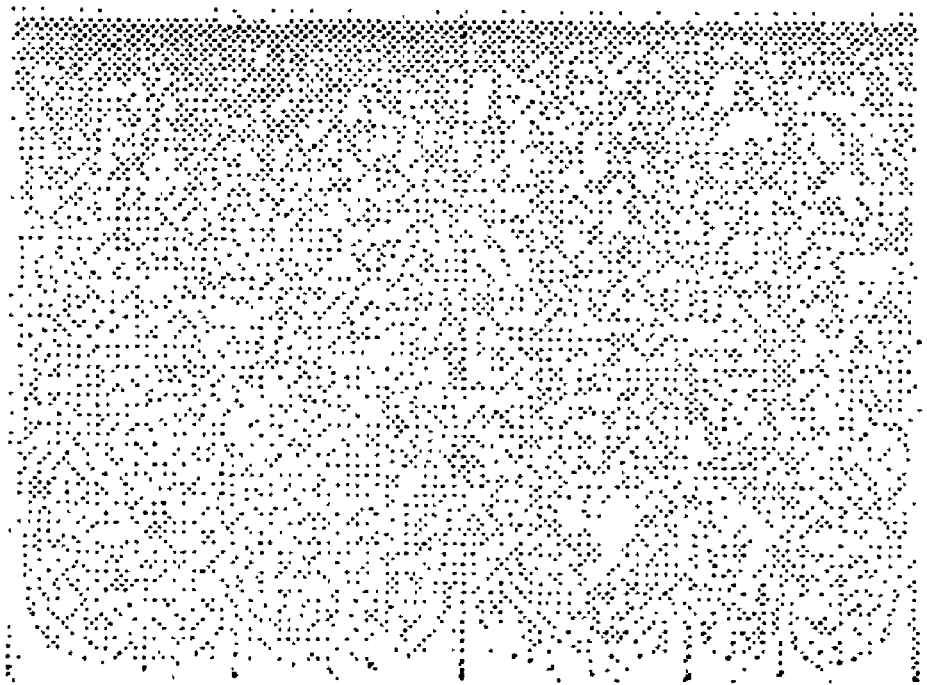
FIG. 30G is a DAD map of the edge group EG5 shown in FIG. 30F.
Figure 30F:
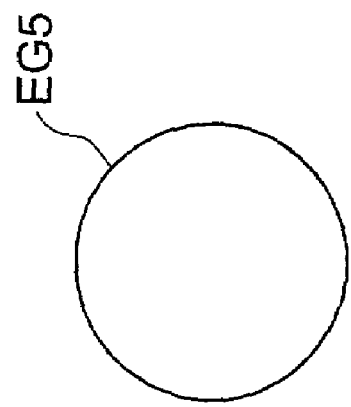
FIG. 30F is a diagram schematically showing the edge group EG5 of the sequence of edge points of the hole pattern HP7 shown in FIG. 30A.
Figure 31B:
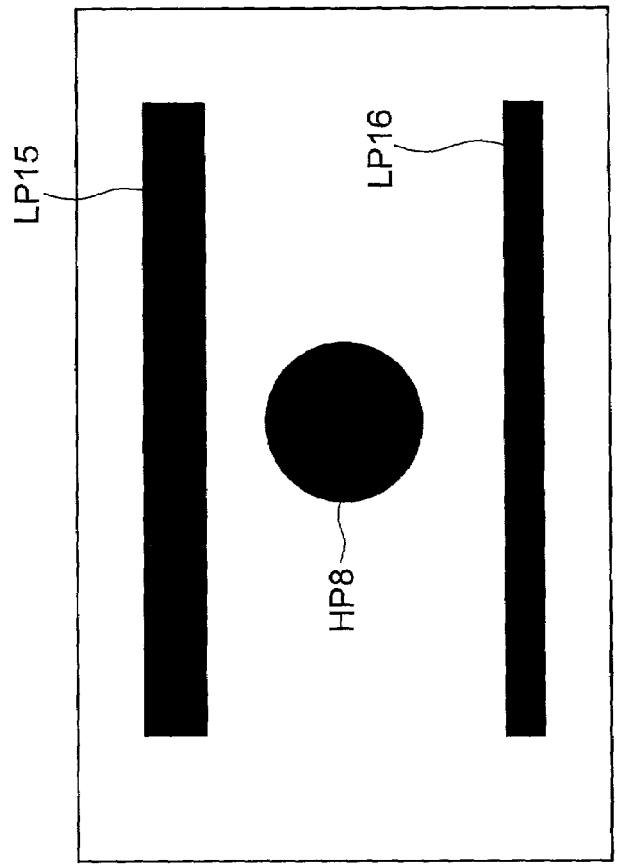
FIGS. 31A and 31B are other examples of images wherein a plurality of patterns exist in a same region, respectively.
Figure 31A:
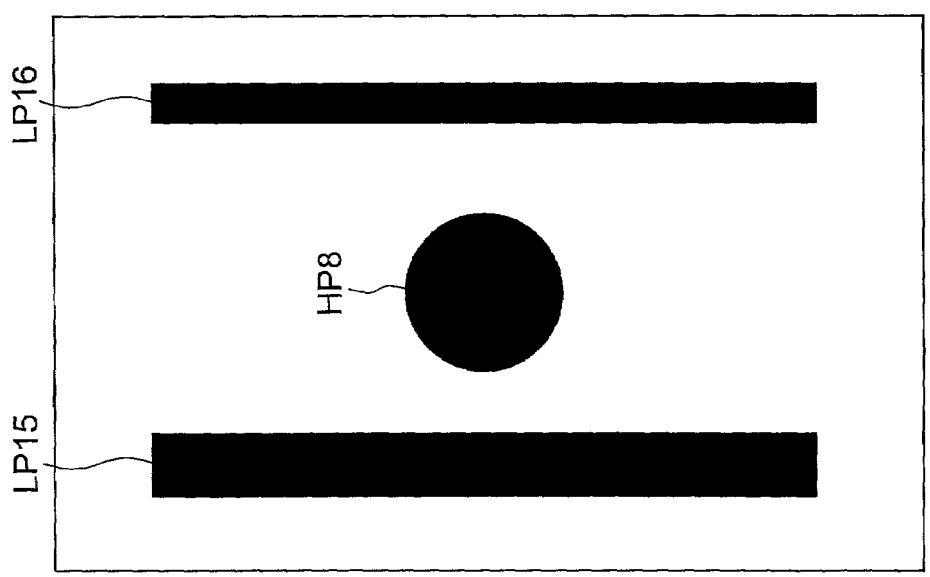

FIG. 30F schematically shows the edge group EG5 of the sequence of edge points of the hole pattern HP7 shown in FIG. 30A. FIG. 30G shows a DAD map of the edge group EG5 shown in FIG. 30F. In this embodiment, the division of edges as in the fifth embodiment is not carried out, and DAD maps are formed with respect to all of pairs of edge points on the pattern. For that reason, FIG. 30G is apparently different from FIG. 12.

The above described DAD maps of FIGS. 30B, 30E and 30G are generated at a step in the measuring procedure. The measuring operator does not require being conscious of DAD, so that these DAD maps are not required to be displayed for the measuring operator. This point is the same in other embodiments.

The DAD maps thus generated are stored in separate regions in a computer memory (see the memory 16 in FIG. 1), so that characteristics can be extracted with respect to the respective DAD maps. At this time, it is effective to set an inhibiting processing in order to omit unnecessary characteristic extraction in accordance with the purpose of measurement. In this case, when an attribute is detected for every group prior to grouping, such as whether an edge group belongs to a closed curve or to an open curve, or in the case of a closed curve, whether an edge group belongs to the right end or the left end of a pattern, it is possible to greatly reduce the time required to extract characteristic quantity, for example, if the measurement purpose is to measure line width of a line pattern and a rule is provided so that a DAD map including a closed curve is not prepared. For example, when twelfth DAD maps are obtained from an image to be measured, if closed curves are omitted, there are some cases where the number of DAD maps to be characteristic-extracted is six, or there are some cases where the number of DAD maps between edge groups from the left end to the right end is three. This inhibiting processing can be applied as a preprocessing for forming DAD maps. In this case, it is possible to omit the time required to prepare unnecessary DAD maps. In order to know the above described attribute of edge groups, it is required to carry out a processing therefor when edge points are detected and grouped. This processing is not described herein.

If the characteristic quantities of X coordinates at the vertexes of the respective curves are extracted from the above described three DAD maps, and for example, if the minimum value thereof is outputted, the thinner line width of two line patterns can be measured. In this case, wherever a thinner line pattern exists in an image for example as the line pattern LP16 shown in FIGS. 10A and 10B, the thinner line width can be always measured by the same method. In addition thereto, another major feature of this embodiment is that various measurements, such as calculation of the diameter of a hole pattern and the shortest distance between a line pattern and the hole pattern, can be carried out by a single measurement.

(C) Recorded Medium

A series of procedures in the above described pattern evaluation method may be stored in a flexible disk or a recording medium, such as a CD-ROM, as a program for causing a computer to execute the procedures, to be read by the computer to be executed. Thus, the pattern evaluation method according to the present invention can be realized by using a general purpose computer. The recording medium should not be limited to a portable recording medium, such as a magnetic disk or an optical disk, but it may be a fixed recording medium, such as a hard disk unit or a memory. In addition, a program including the above described series of procedures in the pattern evaluation method may be distributed via a communication line (including a radio communication), such as Internet. Moreover, a program including the above described series of procedures in the pattern evaluation method is encrypted, modulated or compressed to be distributed via a wire or radio line, such as Internet, or to be stored in a recording medium to be distributed.

What is claimed is:

1. A pattern evaluation method comprising:
processing image data of at least one pattern serving as an object to be evaluated and detecting coordinates of edge points of the pattern in an image of the image data;
making pairs of edge points from said edge points of the pattern;
setting an arbitrary axis;
calculating a distances between said edge points of each pair of said pairs of edge points and an angle between a straight line connecting the edge points of said pair and said axis;
preparing a distance/angle distribution map which represents distribution of said distances and angles of said pairs of edge points;
extracting a characteristic point of said distance/angle distribution map; and
analyzing the pattern on the basis of said extracted characteristic point.

2. A pattern evaluation method according to claim 1, wherein said making of said pairs of edge points includes at least one of:
making a pair of an edge point belonging to a pattern edge arranged on one side of the image and an edge point belonging to a pattern edge arranged on the other side of the image, when the pattern is a line pattern; and
setting an arbitrary dividing line when the pattern is a closed curved pattern, dividing said closed curved pattern into two parts with said dividing line and making a pair of an edge point belonging to the pattern edge arranged on one side of said divided closed curved pattern and an edge point belonging to the pattern edge arranged on the other side of said closed curved pattern.

3. A pattern evaluation method according to claim 2, wherein said extracting of the characteristic point is carried out by image-processing said distance/angle distribution map.

4. A pattern evaluation method according to claim 1, wherein said detecting of coordinates of said edge points includes storing the image data, and said preparing of said distance/angle distribution map further includes adding a memory address to data of said distance/angle distribution map, said memory address corresponding to a storage region which is different from a region in which the image data is stored.

5. A pattern evaluation method according to claim 4, wherein said preparing of said distance/angle distribution map further includes proportional-distributing vertical subpixels for every said pair of edge points on the basis of said distance and said angle, and
said memory address is added to data of said distance/angle distribution as image data of a plurality of bits.

6. A pattern evaluation method according to claim 4, which further comprises adding restoring information to data of said distance/angle distribution map on the basis of position information on said pairs of edge points, said restoring information allowing data of said distance/angle distribution map to be inversely transformed to the image data.

7. A pattern evaluation method according to claim 1, wherein said extracting of said characteristic point includes adding a gradation value indicative of density to data of said distance/angle distribution map or data in the vicinity of said characteristic point of said distance/angle distribution map.

8. A pattern evaluation method according to claim 1, wherein image data of at least one ideal pattern having an ideal shape is further given,
said distance/angle distribution map is prepared with respect to each of said ideal pattern and the pattern which is the object to be evaluated, and
said extracting of said characteristic point further includes extracting an ideal characteristic point, which is a characteristic point of said distance/angle distribution map obtained from said ideal pattern, and a characteristic point of said distance/angle distribution map obtained from the pattern to be evaluated, and outputting a difference between said characteristic point extracted from the pattern to be evaluated and said ideal characteristic point.

9. A pattern evaluation method according to claim 1, wherein a plurality of patterns are to be evaluated, and
said distance/angle distribution map is prepared for each of the patterns, and
which further comprises synthesizing said distance/angle distribution map prepared for each of the patterns to prepare a first synthesized distribution map,
said extracting of said characteristic point including extracting a characteristic point for each of the patterns and a characteristic point indicative of a positional relationship between the patterns from said first synthesized distribution map.

10. A pattern evaluation method according to claim 1, wherein a plurality of patterns are to be evaluated, and
said making of said pairs of edge points includes setting an inhibiting rule for inhibiting a pair of pattern edges which belong to different patterns from being made.

11. A pattern evaluation method according to claim 1, wherein a plurality of patterns are to be evaluated, and
said making of said pairs of edge points includes making a pair of pattern edges which belong to different patterns.

12. A pattern evaluation method according to claim 1, wherein a plurality of patterns are to be evaluated, and
which further comprises preparing a second synthesized distance/angle distribution map by executing calculation between said distance/angle distribution maps which are prepared for each of the patterns,
said extracting of said characteristic point including extracting said characteristic point from said second synthesized distance/angle distribution map to quantify the difference between the shapes of the patterns.

13. A pattern evaluation method according to claim 1, wherein a plurality of patterns are to be evaluated,
said distance/angle distribution map being prepared for each of the pattern,
said characteristic point being extracted from said distance/angle distribution map prepared for each of the patterns, and
which further comprises executing calculation between said extracted characteristic points to quantify the difference between the characteristic points.

14. A pattern evaluation method according to claim 1, wherein at least one closed curved pattern is to be evaluated, and
which further comprises providing a characteristic curve of said distance/angle distribution map,
said characteristic point being extracted on the basis of said characteristic curve.

15. A pattern evaluation method according to claim 1, wherein at least one closed curved pattern is to be evaluated, and
said making of the pairs of edge points includes setting an arbitrary dividing line and an arbitrary point in the closed curved pattern for each of the closed curved pattern, rotating said dividing line about said arbitrary point by an arbitrary angle, dividing each of said closed curved patterns into two parts by said dividing line for every said arbitrary angle and making a pair of an edge point belonging to a pattern edge arranged on one side of said divided closed curved pattern and an edge point belonging to a pattern edge arranged on the other side of said divided closed curved pattern for every said arbitrary angle,
said distance/angle distribution map being prepared for every said arbitrary angle.

16. A pattern evaluation method according to claim 1, wherein a plurality of closed curved patterns are to be evaluated, and
said making of the pairs of edge points includes setting an arbitrary dividing line of said closed curved patterns for each of said closed curved patterns, dividing each of said closed curved patterns into two parts by said dividing line and making a pair of an edge point belonging to the pattern edge arranged on one side of said divided closed curved pattern and an edge point belonging to a pattern edge arranged on the other side of said divided closed curved pattern for each of said closed curved patterns,
said distance/angle distribution map being prepared for each of said closed curved patterns,
said extracting of the characteristic point including providing a characteristic curve for each of the prepared distance/angle distribution maps of said closed curved patterns and extracting said characteristic point for each of said closed curved patterns on the basis of said characteristic curve, and which further comprises executing calculation between said extracted characteristic points to quantify the difference between said plurality of closed curved patterns.

17. A pattern evaluation method according to claim 1, wherein at least one line pattern is to be evaluated, and said extracting of the characteristic point includes providing at least one approximate curve in said distance/angle distribution map to extract said characteristic point on the basis of said approximate curve, said approximate curve being expressed by a function of x=D/cos y in which x is said distance, y being said angle and D being the width of the line pattern.

18. A pattern evaluation method according to claim 1, wherein the image data comprises a series of time-varied image data, and said making of the pairs of edge points, said calculation, said preparing of said distance/angle distribution map and said extracting of the characteristic point are sequentially executed with respect to image data constituting said series of image data, and which further comprises outputting the variation of said extracted characteristic points in real time.

19. A pattern evaluation system comprising:

an edge point detecting part which receives image data of at least one pattern which is an object to be evaluated and processes the image data to detect coordinates of an edge point of the pattern;

a pairing part which makes a pair of edge points of the pattern;

an calculation part which sets an arbitrary axis and calculates a distance between edge points constituting said pair of edge points and an angle between a straight line connecting said edge points and said axis;

a distance/angle distribution map preparing part which prepares a distance/angle distribution map which represents distribution of said distance and said angle of said pair of edge points;

a characteristic point extracting part which extracts a characteristic point of said distance/angle distribution map; and an analyzing part which analyzes the pattern on the basis of the extracted characteristic point.

20. A pattern evaluation system according to claim 19, wherein when the pattern is a line pattern said pairing part makes a pair of an edge point belonging to a pattern edge arranged on one side of the image and an edge point belonging to a pattern edge arranged on the other side of the image, and when the pattern is a closed curved pattern said pairing part sets an arbitrary dividing line for dividing the closed curved pattern, divides the closed curved pattern into two parts by said dividing line and makes a pair of an edge point belonging to a pattern edge arranged on one side of said divided closed curved pattern and an edge point belonging to a pattern edge arranged on the other side of said closed curved pattern.

21. A pattern evaluation system according to claim 19, which further comprises a memory part which includes a first storage region for storing the image data and a second storage region for storing data of said distance/angle distribution map.

22. A pattern evaluation system according to claim 19, wherein said edge point detecting part further receives image data of at least one ideal pattern having an ideal shape, and said characteristic point extracting part extracts an ideal characteristic point, which is a characteristic point of said distance/angle distribution map obtained from the ideal pattern, and a characteristic point of said distance/angle distribution map obtained from the pattern to be evaluated and outputs a difference between said characteristic point of the pattern to be evaluated and said ideal characteristic point.

23. A pattern evaluation system according to claim 19, wherein said edge point detecting part receives image data of a plurality of patterns, and said distance/angle distribution map preparing part prepares said distance/angle distribution map for each of the patterns and prepares a first synthesized distribution map by synthesizing the prepared distance/angle distribution map;

said characteristic point extracting part extracts a characteristic point for each of the patterns and a characteristic point indicative of a relative positional relationship between the patterns from said first synthesized distribution map.

24. A pattern evaluation system according to claim 19, wherein said edge point detecting part receives image data of a plurality of patterns, and said paring part sets an inhibiting rule for inhibiting a pair of pattern edges which belong to different patterns from being made and makes a pair of edge points on the basis of said inhibiting rule.

25. A pattern evaluation system according to claim 19, wherein said edge point detecting part receives image data of a plurality of patterns, and said pairing part makes a pair of pattern edges which belong to different patterns.

26. A pattern evaluation system according to claim 19, wherein said edge point detecting part receives image data of a plurality of patterns, said distance/angle distribution map preparing part prepares said distance/angle distribution map for every pattern and prepares a second synthesized distance/angle distribution map by executing calculation between the prepared distance/angle distribution maps, and said characteristic point extracting part extracts said characteristic point from said second synthesized distance/angle distribution map to quantify the difference between the patterns.

27. A pattern evaluation system according to claim 19, wherein said edge point detecting part receives image data of a plurality of patterns, said distance/angle distribution map preparing part prepares said distance/angle distribution map for every pattern, and said characteristic point extracting part extracts said characteristic point from said distance/angle distribution map which is prepared for every pattern and executes calculation between the extracted characteristic points to quantify the difference between the extracted characteristic points.

28. A pattern evaluation system according to claim 19, wherein said edge point detecting part receives image data of at least one closed curved pattern, and said characteristic point extracting part provides a characteristic curve of said distance/angle distribution map to extract said characteristic point on the basis of said characteristic curve.

29. A pattern evaluation system according to claim 19, wherein said edge point detecting part receives image data of at least one closed curved pattern, and said paring part sets an arbitrary dividing line for dividing the closed curved pattern and an arbitrary point in the closed curved pattern, rotates said dividing line about said arbitrary point by an arbitrary angle, divides the closed curved pattern into two parts by said dividing line for every said arbitrary angle and makes a pair of an edge point belonging to a pattern edge arranged on one side of the divided closed curved pattern and an edge point belonging to a pattern edge arranged on the other side of the divided closed curved pattern for every said arbitrary angle, said distance/angle distribution map preparing part preparing said distance/angle distribution map for every said arbitrary angle.

30. A pattern evaluation system according to claim 19, wherein said edge point detecting part receives image data of a plurality of closed curved patterns, said distance/angle distribution map preparing part prepares said distance/angle distribution map for each of the closed curved patterns, and said characteristic point extracting part provides a characteristic curve for each of said prepared distance/angle distribution maps of the closed curved patterns, extracts said characteristic point for each of the closed curved patterns on the basis of said characteristic curve and executes calculation between the extracted characteristic points to quantify the difference between the closed curved patterns.

31. A pattern evaluation system according to claim 19, wherein said edge point detecting part receives image data of at least one line pattern, and said characteristic point extracting part provides at least one approximate curve in said distance/angle distribution map to extract said characteristic point on the basis of said approximate curve, said approximate curve being expressed by a function of x=D/cos y in which x is said distance, y being said angle and D being the width of said line pattern.

32. A pattern evaluation system according to claim 19, wherein the image data includes a series of time-varied image data, and said paring part, said calculation part, said distance/angle distribution map preparing part and said characteristic point extracting part sequentially carry out the calculation, the preparation of said distance/angle distribution map and the extraction of said characteristic point with respect to image data constituting said series of image data, and which further comprises an output part which outputs the variation of said extracted characteristic points in real time.

33. A computer-readable recorded medium for use in a computer, said medium having recorded a program for causing said computer to execute a pattern evaluation method, said method comprising:

processing image data of at least one pattern serving as an object to be evaluated and detecting coordinates of edge points of the pattern in an image of the image data;

making pairs of edge points from said edge points of the pattern;

setting an arbitrary axis;

calculating a distances between said edge points of each pair of said pairs of edge points and an angle between a straight line connecting the edge points of said pair and said axis;

preparing a distance/angle distribution map which represents distribution of said distances and angles of said pairs of edge points;

extracting a characteristic point of said distance/angle distribution map; and analyzing the pattern on the basis of said extracted characteristic point.

34. A computer-readable recorded medium according to claim 33, wherein said making of said pairs of edge points includes at least one of:

making a pair of an edge point belonging to a pattern edge arranged on one side of the image and an edge point belonging to a pattern edge arranged on the other side of the image, when the pattern is a line pattern; and setting an arbitrary dividing line when the pattern is a closed curved pattern, dividing said closed curved pattern into two parts with said dividing line and making a pair of an edge point belonging to the pattern edge arranged on one side of said divided closed curved pattern and an edge point belonging to the pattern edge arranged on the other side of said closed curved pattern.

35. A computer-readable recorded medium according to claim 33, wherein said detecting of coordinates of said edge points includes storing the image data, and said preparing of said distance/angle distribution map further includes adding a memory address to data of said distance/angle distribution map, said memory address corresponding to a storage region which is different from a region in which the image data is stored.

36. A computer-readable recorded medium according to claim 33, wherein image data of at least one ideal pattern having an ideal shape is further given, said distance/angle distribution map is prepared with respect to each of said ideal pattern and the pattern which is the object to be evaluated, and said extracting of said characteristic point further includes extracting an ideal characteristic point, which is a characteristic point of said distance/angle distribution map obtained from said ideal pattern, and a characteristic point of said distance/angle distribution map obtained from the pattern to be evaluated, and outputting a difference between said characteristic point extracted from the pattern to be evaluated and said ideal characteristic point.

37. A computer-readable recorded medium according to claim 33, wherein a plurality of patterns are to be evaluated, and said distance/angle distribution map is prepared for each of the patterns, and which further comprises synthesizing said distance/angle distribution map prepared for each of the patterns to prepare a first synthesized distribution map, said extracting of said characteristic point including extracting a characteristic point for each of the patterns and a characteristic point indicative of a positional relationship between the patterns from said first synthesized distribution map.

38. A computer-readable recorded medium according to claim 33, wherein a plurality of patterns are to be evaluated, and said making of said pairs of edge points includes setting an inhibiting rule for inhibiting a pair of pattern edges which belong to different patterns from being made.

39. A computer-readable recorded medium according to claim 33, wherein a plurality of patterns are to be evaluated, and said making of said pairs of edge points includes making a pair of pattern edges which belong to different patterns.

40. A computer-readable recorded medium according to claim 33, wherein a plurality of patterns are to be evaluated, and said pattern evaluation method further comprises preparing a second synthesized distance/angle distribution map by executing calculation between said distance/angle distribution maps which are prepared for each of the patterns, said extracting of said characteristic point including extracting said characteristic point from said second synthesized distance/angle distribution map to quantify the difference between the shapes of the patterns.

41. A computer-readable recorded medium according to claim 33, wherein a plurality of patterns are to be evaluated, said distance/angle distribution map being prepared for each of the pattern, said characteristic point being extracted from said distance/angle distribution map prepared for each of the patterns, and which further comprises executing calculation between said extracted characteristic points to quantify the difference between the characteristic points.

42. A computer-readable recorded medium according to claim 33, wherein at least one closed curved pattern is to be evaluated, and said pattern evaluation method further comprises providing a characteristic curve of said distance/angle distribution map, said characteristic point being extracted on the basis of said characteristic curve.

43. A computer-readable recorded medium according to claim 33, wherein at least one closed curved pattern is to be evaluated, and said making of the pairs of edge points includes setting an arbitrary dividing line and an arbitrary point in the closed curved pattern for each of the closed curved pattern, rotating said dividing line about said arbitrary point by an arbitrary angle, dividing each of said closed curved patterns into two parts by said dividing line for every said arbitrary angle and making a pair of an edge point belonging to a pattern edge arranged on one side of said divided closed curved pattern and an edge point belonging to a pattern edge arranged on the other side of said divided closed curved pattern for every said arbitrary angle, said distance/angle distribution map being prepared for every said arbitrary angle.

44. A computer-readable recorded medium according to claim 33, wherein a plurality of closed curved patterns are to be evaluated, and said making of the pairs of edge points includes setting an arbitrary dividing line of said closed curved patterns for each of said closed curved patterns, dividing each of said closed curved patterns into two parts by said dividing line and making a pair of an edge point belonging to the pattern edge arranged on one side of said divided closed curved pattern and an edge point belonging to a pattern edge arranged on the other side of said divided closed curved pattern for each of said closed curved patterns, said distance/angle distribution map being prepared for each of said closed curved patterns, said extracting of the characteristic point including providing a characteristic curve for each of the prepared distance/angle distribution maps of said closed curved patterns and extracting said characteristic point for each of said closed curved patterns on the basis of said characteristic curve, and said pattern evaluation method further comprises executing calculation between said extracted characteristic points to quantify the difference between said plurality of closed curved patterns.

45. A computer-readable recorded medium according to claim 33, wherein at least one line pattern is to be evaluated, and said extracting of the characteristic point includes providing at least one approximate curve in said distance/angle distribution map to extract said characteristic point on the basis of said approximate curve, said approximate curve being expressed by a function of x=D/cos y in which x is said distance, y being said angle and D being the width of the line pattern.

46. A computer-readable recorded medium according to claim 33, wherein the image data comprises a series of time-varied image data, and said making of the pairs of edge points, said calculation, said preparing of said distance/angle distribution map and said extracting of the characteristic point are sequentially executed with respect to image data constituting said series of image data, and said pattern evaluation method further comprises outputting the variation of said extracted characteristic points in real time.

* * * * *

UNITED STATES PATENT AND TRADEMARK OFFICE
CERTIFICATE OF CORRECTION

PATENT NO. : 6,985,626 B2
DATED : January 10, 2006
INVENTOR(S) : Mitsui

It is certified that error appears in the above-identified patent and that said Letters Patent is hereby corrected as shown below:

Column 14,
Line 47, change "calculating a distances" to -- calculating a distance --.

Column 17,
Line 35, change "an calculatio n" to -- a calculation --.

Column 20,
Line 2, change "calculating a distances" to -- calculating a distance --.

Signed and Sealed this

Twenty-fifth Day of April, 2006

JON W. DUDAS
*Director of the United States Patent and Trademark Office*